US012132248B2

(12) United States Patent
Ho et al.

(10) Patent No.: US 12,132,248 B2
(45) Date of Patent: Oct. 29, 2024

(54) ELECTRONIC DEVICE

(71) Applicant: Advanced Semiconductor Engineering, Inc., Kaohsiung (TW)

(72) Inventors: Cheng-Yu Ho, Kaohsiung (TW); Meng-Wei Hsieh, Kaohsiung (TW); Chih-Pin Hung, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 142 days.

(21) Appl. No.: 17/894,946

(22) Filed: Aug. 24, 2022

(65) Prior Publication Data

US 2024/0072413 A1 Feb. 29, 2024

(51) Int. Cl.

| | |
|---|---|
| ***H01Q 1/22*** | (2006.01) |
| ***H01Q 1/52*** | (2006.01) |
| ***H01Q 21/06*** | (2006.01) |
| ***H01Q 25/00*** | (2006.01) |

(52) U.S. Cl.
CPC ........... *H01Q 1/2283* (2013.01); *H01Q 1/523* (2013.01); *H01Q 21/065* (2013.01); *H01Q 25/00* (2013.01)

(58) Field of Classification Search
CPC .... H01Q 1/2283; H01Q 1/523; H01Q 21/065; H01Q 25/00
See application file for complete search history.

(56) References Cited

U.S. PATENT DOCUMENTS

2018/0205155 A1 7/2018 Mizunuma et al.
2022/0069453 A1* 3/2022 Yun .......................... H04B 3/52

* cited by examiner

*Primary Examiner* — Dieu Hien T Duong
(74) *Attorney, Agent, or Firm* — FOLEY & LARDNER LLP

(57) ABSTRACT

An electronic device is provided. The electronic device includes an antenna array including a plurality of antenna patterns collectively configured to provide a scan-angle coverage. Each of the antenna patterns includes a curved surface.

17 Claims, 24 Drawing Sheets

ELECTRONIC DEVICE

BACKGROUND

1. Technical Field

The present disclosure relates generally to an electronic device.

2. Description of the Related Art

In a system-in-package (SiP) containing multiple components (or elements) in a single device (or a single package), antenna on package (AoP) or antenna in package (AiP) may be a novel approach to integration of one or more antenna elements into the SiP. In order to improve the radiation performance of the AoP or AiP, an antenna array including multiple antenna elements is integrated into the SiP. However, the increased antenna elements may commensurately increase the size of the antenna structure, costs, and difficulty of manufacture, while reducing yield. Thus, it is desirable to provide an antenna element array in the SiP ameliorating the noted shortcomings.

SUMMARY

In one or more embodiments, an electronic device includes an antenna array including a plurality of antenna patterns collectively configured to provide a scan-angle coverage. Each of the antenna patterns includes a curved surface.

In one or more embodiments, an electronic device includes a carrier and an antenna array. The carrier has a plurality of recesses recessed from a top surface of the carrier. The antenna array includes a plurality of antenna patterns, wherein each of the antenna patterns includes a curved surface to be configured to increase an antenna gain of the antenna array, and each of the antenna patterns is disposed in a corresponding recess of the plurality of recesses.

In one or more embodiments, an electronic device includes an antenna array including a plurality of antenna patterns configured to increase an antenna gain of the antenna array, wherein each of the antenna patterns includes a curved surface and a curvature center, and at least two of the curvature centers are located at different positions.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1A:
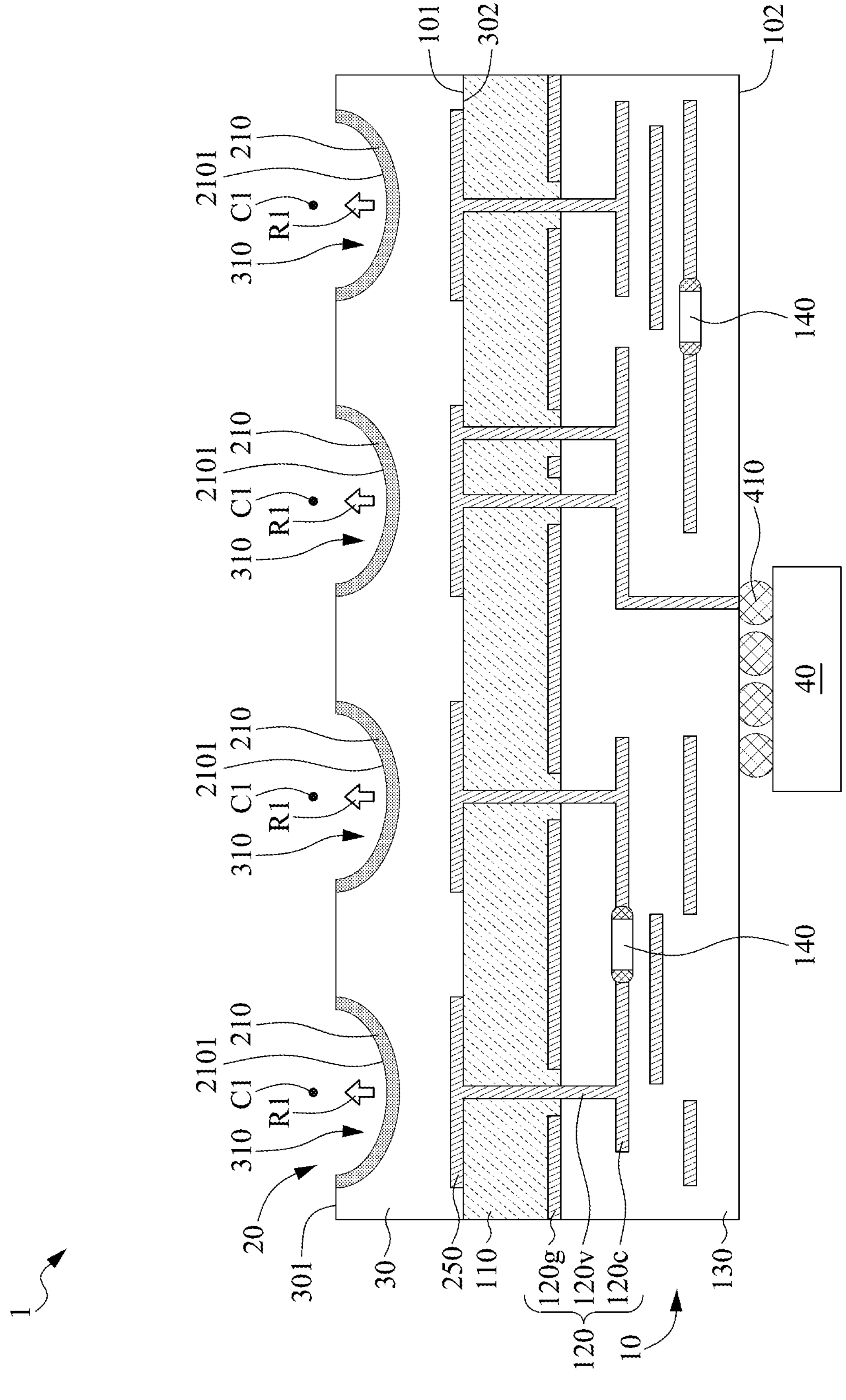
FIG. 1A is a cross-section of an electronic device in accordance with some embodiments of the present disclosure.

FIG. 1A is a cross-section of an electronic device 1 in accordance with some embodiments of the present disclosure. The electronic device 1 includes a substrate 10, an antenna array 20, a carrier 30, and an electronic component 40.

The substrate 10 may include, for example, a printed circuit board, such as a paper-based copper foil laminate, a composite copper foil laminate, or a polymer-impregnated glass-fiber-based copper foil laminate. The substrate 10 may include an interconnection structure, which may include a plurality of conductive traces and/or conductive vias. The interconnection structure may include a redistribution layer (RDL) and/or grounding element. In some embodiments, the substrate 10 includes a ceramic material or a metal plate. In some embodiments, the substrate 10 may include an organic substrate or a leadframe. In some embodiments, the substrate 10 may include a two-layer substrate which includes a core layer and a conductive material and/or structure disposed on an upper surface (or a top surface) and/or a lower surface (or a bottom surface) of the substrate 10. The conductive material and/or structure may include a plurality of traces. The substrate 10 may include one or more conductive pads in proximity to, adjacent to, or embedded in and exposed by an upper surface and/or a lower surface of the substrate 10.

In some embodiments, the substrate 10 includes a core layer 110, an interconnection structure 120, a dielectric structure 130, and devices 140. In some embodiments, the core layer 110 may be a silicon substrate, an organic substrate, or a ceramic substrate. In some embodiments, the interconnection structure 120 may include a plurality of conductive layers 120*c* (also referred to as "conductive traces"), a plurality of conductive vias 120*v* electrically connecting the conductive layers 120*c*, and a grounding element 120*g*. In some embodiments, the conductive vias 120*v* penetrate the core layer 110 and the dielectric structure 130. In some embodiments, the grounding element 120*g* may be or include one or more grounding layers (e.g. conductive layers). In some embodiments, the grounding element 120*g* is exposed by a lateral surface of the substrate 10. In some embodiments, the dielectric structure 130 may include one or more dielectric layers, the conductive layers 120*c* may be disposed between the dielectric layers, and the conductive vias 120*v* may penetrate the one or more dielectric layers. In some embodiments, the devices 140 may be or include surface mount devices (SMDs). The SMDs may be or include one or more active devices, one or more passive devices, or a combination thereof. In some embodiments, the devices 140 are electrically connected to the interconnection structure 120. In some other embodiments, the substrate 10 may include a coreless substrate, such as including an RDL structure, and the dielectric structure 130 may include one or more dielectric layers (e.g., including PI or other suitable dielectric material(s)) interposed between the RDLs of the RDL structure.

The antenna array 20 may include a plurality of antenna patterns 210 and be configured to increase an antenna gain of the antenna array 20. Each of the antenna patterns of the antenna array 20 may include its own curved surface. In some embodiments, each of the antenna patterns 210 includes a curved surface 2101 and a curvature center C1. In some embodiments, each of the antenna patterns 210 includes a curved surface 2101 to be configured to increase an antenna gain of the antenna array 20. The curvature center C1 may be a focus of an ellipse or a center of a circle. In some embodiments, the antenna patterns 210 may have the same or different curvature radii. In some embodiments, at least two of the curvature centers C1 are located above the carrier 30. In some embodiments, at least two of the curvature centers C1 are located at different positions. In some embodiments, at least two of the curvature centers C1 are located at the same elevation or different elevations with respect to a surface 101 (also referred to as "a top surface") of the substrate 10. In some embodiments, a projection of the curvature center C1 of one of the antenna patterns 210 (also referred to as "a first antenna pattern") is free from overlapping another of the antenna patterns 210 (also referred to as "a second antenna pattern"). In some embodiments, the antenna pattern 210 is configured to radiate electromagnetic (EM) radiation in a radiation direction R1. In some embodiments, at least two of the antenna patterns 210 have radiation directions R1 substantially parallel. In some embodiments, the radiation directions R1 of least two of the antenna patterns 210 are substantially perpendicular to the surface 101 of the substrate 10. In some embodiments, the antenna patterns 210 may be or include dish antenna elements.

In some embodiments, the antenna array 20 further includes antenna patterns 250 over the substrate 10. In some embodiments, each of the antenna patterns 250 is disposed under a corresponding antenna pattern 210. In some embodiments, each of the antenna patterns 210 is electrically coupled to a corresponding antenna pattern 250 to construct an antenna element of the antenna array 20. In some embodiments, the antenna pattern 250 is configured to receive a signal from the electronic component 40. In some embodiments, the antenna pattern 250 is configured to transmit a signal to the electronic component 40. In some embodiments, the antenna patterns 250 may be or include patch antenna elements.

The carrier 30 may support the antenna patterns 210. The carrier 30 may include a surface 301 (also referred to as "a top surface") and a surface 302 (also referred to as "a bottom surface") opposite to the surface 301. In some embodiments, the curved surface 2101 of the antenna pattern 210 is recessed from the surface 301 (or the top surface) of the carrier 30. In some embodiments, the radiation directions R1 of least two of the antenna patterns 210 are substantially perpendicular to the surface 301 (or the top surface) of the carrier 30. In some embodiments, the carrier 30 includes an encapsulant. The encapsulant may include an epoxy resin having fillers, a molding compound (e.g., an epoxy molding compound or other molding compound), polyimide, a phenolic compound or material, a material with a silicone dispersed therein, or a combination thereof.

In some embodiments, the carrier 30 has a plurality of recesses 310 recessed from the surface 301 of the carrier 30. In some embodiments, at least two of the antenna patterns 210 are in the recesses 310. In some embodiments, each of the antenna patterns 210 is disposed in a corresponding recess 310. In some embodiments, the antenna pattern 210 is conformal to a concave surface of the corresponding recess 310 of the carrier 30. In some embodiments, the antenna pattern 210 fully covers an inner surface of the corresponding recess 310. In some embodiments, the antenna pattern 210 has a shape substantially the same as that of the corresponding recess 310. In some embodiments, each of the antenna patterns 210 has a shape substantially the same as that of the corresponding recess 310. The recesses 310 may differ in depth, size, shape, or a combination thereof. In some embodiments, the recesses 310 of the carrier 30 of the electronic device 1 have substantially the same depth, size, shape, or a combination thereof. In some embodiments, the recesses 310 may be or include dish-shaped recesses. In some embodiments, a projection of the curvature center C1 of one of the antenna patterns 210 (or the first antenna pattern) is free from overlapping the recess 310 in which another of the antenna patterns 210 (or the second antenna pattern) is disposed.

The electronic component 40 may be disposed under a surface 102 (also referred to as "a bottom surface") of the substrate 10. In some embodiments, the electronic component 40 is electrically connected to the substrate 10 through electrical contacts 410. In some embodiments, the electronic component 40 is electrically coupled to the antenna array 20 through the interconnection structure 120 of the substrate 10. The electronic component 40 may include a RF circuit, a digital circuit, a mixed-signal circuit, or a combination thereof. In some embodiments, the electronic component 40 is a RFIC. The number or the type of the electronic component 40 may vary depending on different design specifications. In some embodiments, the electrical contacts 410 may be or include solder bumps, controlled collapse chip connection (C4) bumps, a ball grid array (BGA), or a land grid array (LGA).

Electromagnetic radiations from the antenna patterns 210 may generate an electromagnetic (EM) field including near-field and far-field regions. In some embodiments, electromagnetic radiations from the antenna patterns 210 interfere in a far-field to communicate wirelessly for long distances. While the far-field region may be the main region of operation, the wave form of the far-field interference is important to the desired function of the antenna array 20. In some embodiments, electromagnetic radiations from the antenna patterns 210 are configured to conduct a far-field interference. In some embodiments, electromagnetic radiations from the antenna patterns 210 are configured to conduct a far-field interference to achieve the desired function of the antenna array 20, e.g., by generating a desired wave pattern of the EM field, adjusting a desired amplitude of the EM field, and/or generating other characteristics of the far-field region of the EM field. According to some embodiments of the present disclosure, with the design of the plurality of antenna patterns 210 of the antenna array 20, the antenna gain can be increased.

In addition, in some cases where wave beams of antennas are focused using only circuit designs rather than structural designs; however, the antenna gain achieved by merely circuit designs is relatively limited. Moreover, in some cases where multiple wave beams of multiple antenna elements are focused at the same focus of an ellipse or the same center of a circle, energy loss may occur along the propagation paths of the radiations of the multiple antennas, and thus the antenna gain is also relatively limited. In contrast, according to some embodiments of the present disclosure, with the design of each of the antenna patterns 210 having its own curvature center C1 located at different positions, each of the wave beams of the antenna patterns 210 can be independently focused to increase the gain of each of the focused wave beams, and then these multiple focused wave beams may be further focused to achieve a further increased antenna gain. Therefore, the antenna gain of the antenna array 20 can be further increased, especially the antenna gain in a far-field region, which is advantageous to the radiation performance of the antenna array 20.

Moreover, according to some embodiments of the present disclosure, the structures of the antenna patterns 210 may be defined by the design of the recesses of the carrier 30, and thus the manufacture of the antenna patterns 210 is relatively simplified. Furthermore, according to some embodiments of the present disclosure, the carrier 30 includes an encapsulant, and the recesses of the carrier 30 may be formed by pressing molds having predetermined structures into predetermined locations of the encapsulant material followed by a curing operation. Therefore, the manufacturing process is simplified, the cost is reduced, and the yield can be increased.

Figure 1B:
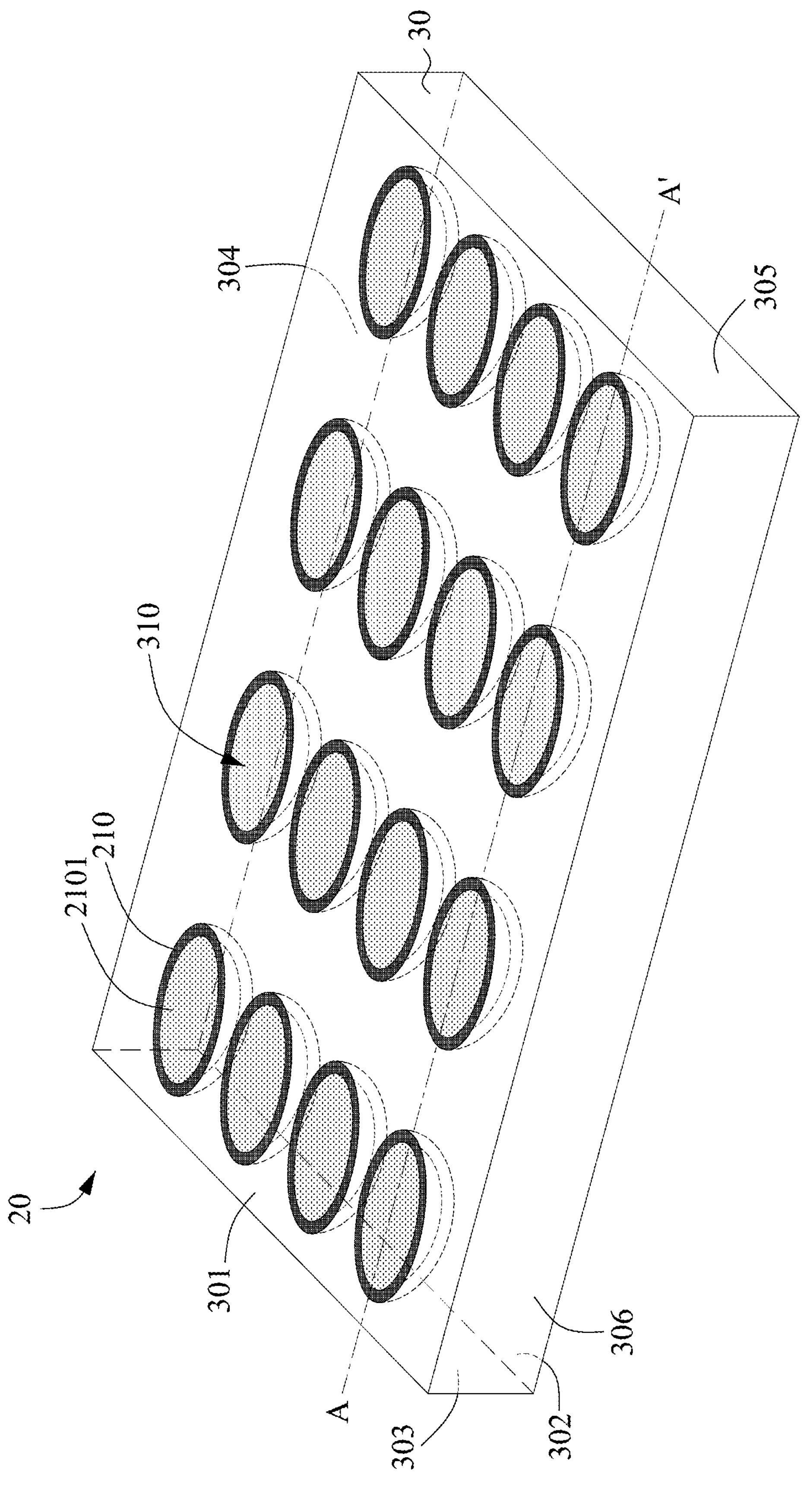
FIG. 1B is a stereoscopic diagram of a portion of an electronic device in accordance with some embodiments of the present disclosure.

FIG. 1B is a stereoscopic diagram of a portion of an electronic device 1 in accordance with some embodiments of the present disclosure. It should be noted that some components/elements are omitted from FIG. 1B for clarity. In some embodiments, FIG. 1A is a cross-section along line A-A' in FIG. 1B.

The carrier 30 may have a lateral surface 303, a lateral surface 305 opposite to the lateral surface 303, a lateral surface 304 extending between the lateral surface 303 and the lateral surface 305, and a lateral surface 306 opposite to the lateral surface 304. In some embodiments, the surface 301 is extending between the lateral surface 303 and the lateral surface 305. In some embodiments, the surface 301 is extending between the lateral surface 304 and the lateral surface 306. In some embodiments, the curved surface 2101 of the antenna pattern 210 is between the lateral surface 303 and the lateral surface 305 of the carrier 30. In some embodiments, the curved surface 2101 of the antenna pattern 210 is between the lateral surface 304 and the lateral surface 306 of the carrier 30.

Figure 2A:
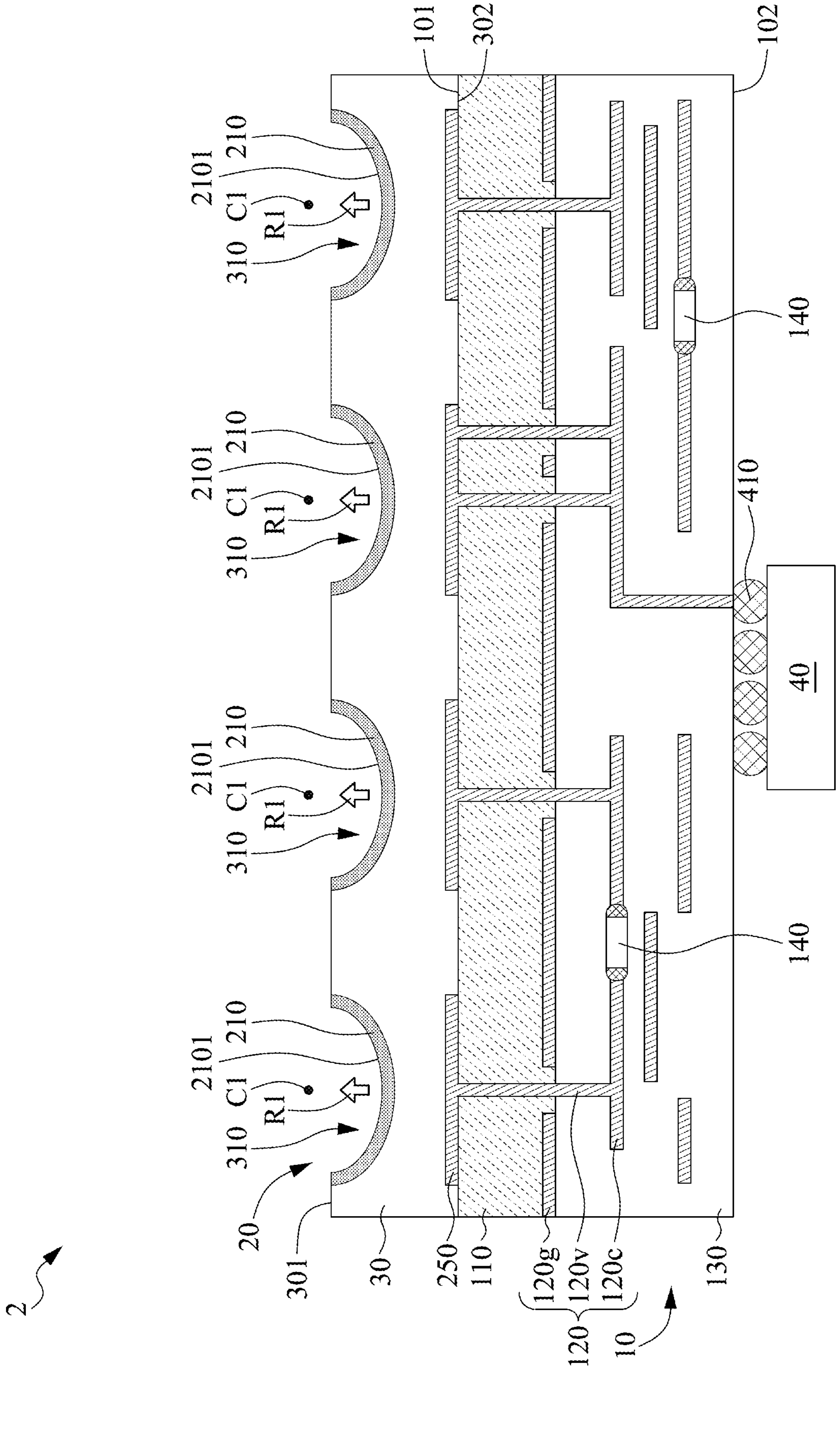
FIG. 2A is a cross-section of an electronic device in accordance with some embodiments of the present disclosure.
Figure 2B:
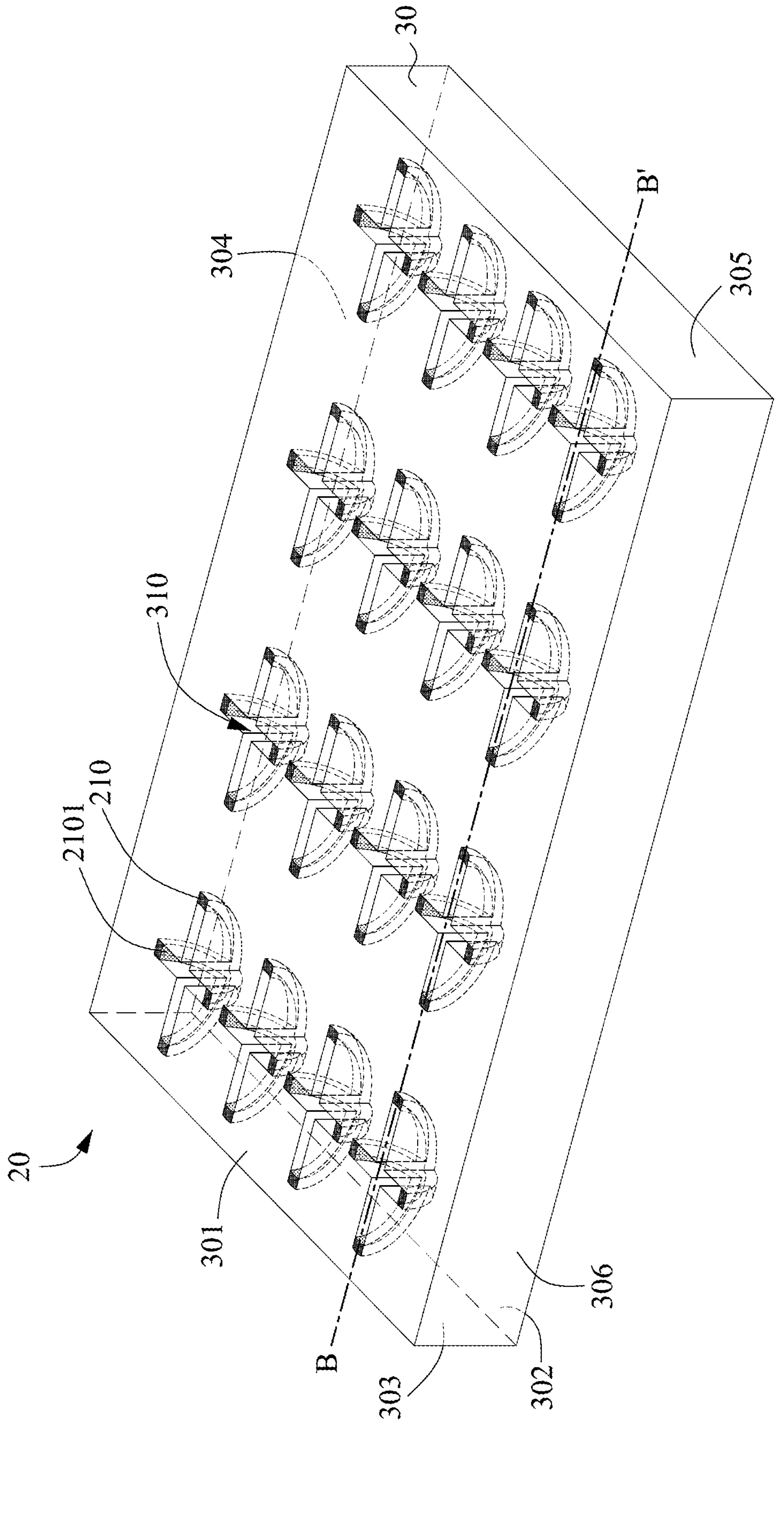
FIG. 2B is a stereoscopic diagram of a portion of an electronic device in accordance with some embodiments of the present disclosure.

FIG. 2A is a cross-section of an electronic device 2 in accordance with some embodiments of the present disclosure, and FIG. 2B is a stereoscopic diagram of a portion of an electronic device 2 in accordance with some embodiments of the present disclosure. It should be noted that some components/elements are omitted from FIG. 2B for clarity. In some embodiments, FIG. 2A is a cross-section along line B-B' in FIG. 2B. The electronic device 2 is similar to the electronic device 1 in FIG. 1A, with differences therebetween as follows.

Each of the antenna pattern 210 may have include a dish antenna element or a cross-shaped antenna element having the same curvature center. In some embodiments, the recesses 310 may be or include cross-shaped recesses. In some embodiments, at least two of the antenna patterns 210 are in the recesses 310 having cross shapes. In some embodiments, the antenna pattern 210 partially covers an inner surface of the corresponding recess 310. In some embodiments, a bottom surface of the antenna pattern 210 is conformal to a cross-shaped concave surface of the corresponding recess 310. In some embodiments, an inner bottom surface (or an inner concave surface) of the recess 310 is covered by the antenna pattern 210, and an inner sidewall of the recess 310 is exposed by the antenna pattern 210. In some embodiments, the antenna pattern 210 includes a cross-shaped antenna element. In some embodiments, the cross-shaped antenna pattern 210 illustrated in FIG. 2B and the dish-shaped antenna pattern 210 illustrated in FIG. 1B located at the same predetermined position of the carrier 10 have the same curvature center. In some embodiments, the antenna patterns 210 may be or include dual polarized antenna elements.

Figure 3A:
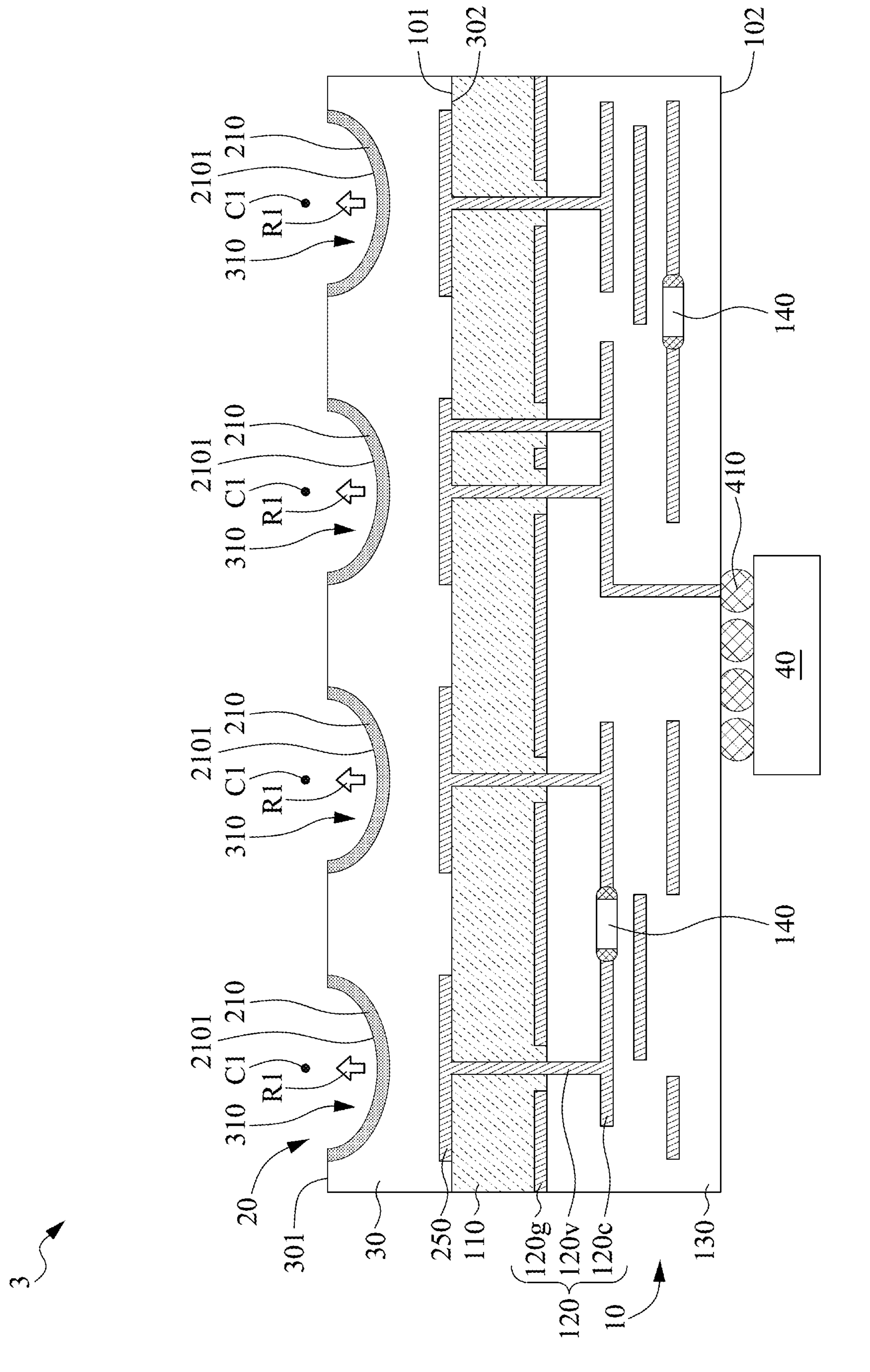
FIG. 3A is a cross-section of an electronic device in accordance with some embodiments of the present disclosure.
Figure 3B:
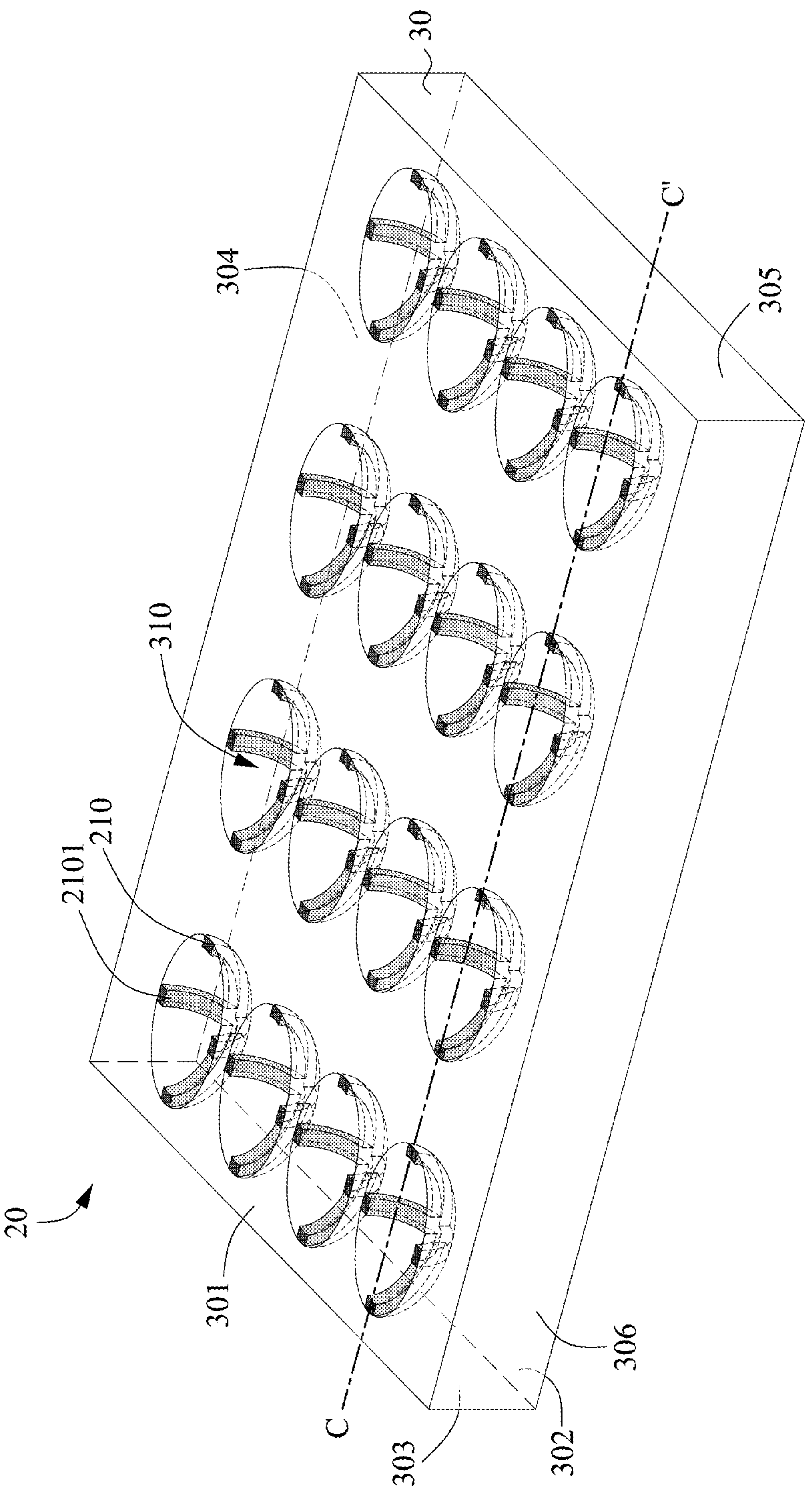
FIG. 3B is a stereoscopic diagram of a portion of an electronic device in accordance with some embodiments of the present disclosure.

FIG. 3A is a cross-section of an electronic device 3 in accordance with some embodiments of the present disclosure, and FIG. 3B is a stereoscopic diagram of a portion of an electronic device 3 in accordance with some embodiments of the present disclosure. It should be noted that some components/elements are omitted in FIG. 3B for clarity. In some embodiments, FIG. 3A is a cross-section along the line C-C' in FIG. 3B. The electronic device 3 is similar to the electronic device 1 in FIG. 1A, with differences therebetween as follows.

In some embodiments, the antenna pattern 210 includes a cross-shaped antenna element. In some embodiments, the recesses 310 may be or include dish-shaped recesses. In some embodiments, at least two of the antenna patterns 210 having cross shapes are in the recesses 310. In some embodiments, the cross-shaped antenna pattern 210 illustrated in FIG. 3B and the dish-shaped antenna pattern 210 illustrated in FIG. 1B located at the same predetermined position of the carrier 10 have the same curvature center. In some embodiments, the antenna pattern 210 partially covers an inner surface of the corresponding recess 310. In some embodiments, the antenna pattern 210 partially covers a curved surface (or an inner concave surface) of the corresponding recess 310. In some embodiments, each of the antenna patterns 210 partially covers a curved surface of the corresponding recess 310. In some embodiments, a bottom surface of the antenna pattern 210 is conformal to a portion of a concave surface of the corresponding recess 310. In some embodiments, the antenna patterns 210 may be or include dual polarized antenna elements.

In some embodiments, at least two of the antenna patterns 210 of the antenna array 20 may have different shapes. For example, the antenna patterns 210 may include one or more cross-shaped antenna elements (as illustrated in FIGS. 2B and 3B) and one or more dish antenna elements (as illustrated in FIG. 1B). In some embodiments, the antenna patterns 210 of different shapes may have the same curvature or different curvatures. In some embodiments, at least two of the recesses 310 may have different shapes. For example, the recesses 310 may include one or more cross-shaped recesses (as illustrated in FIG. 2B) and one or more dish-shaped recesses (as illustrated in FIG. 3B).

Figure 4A:
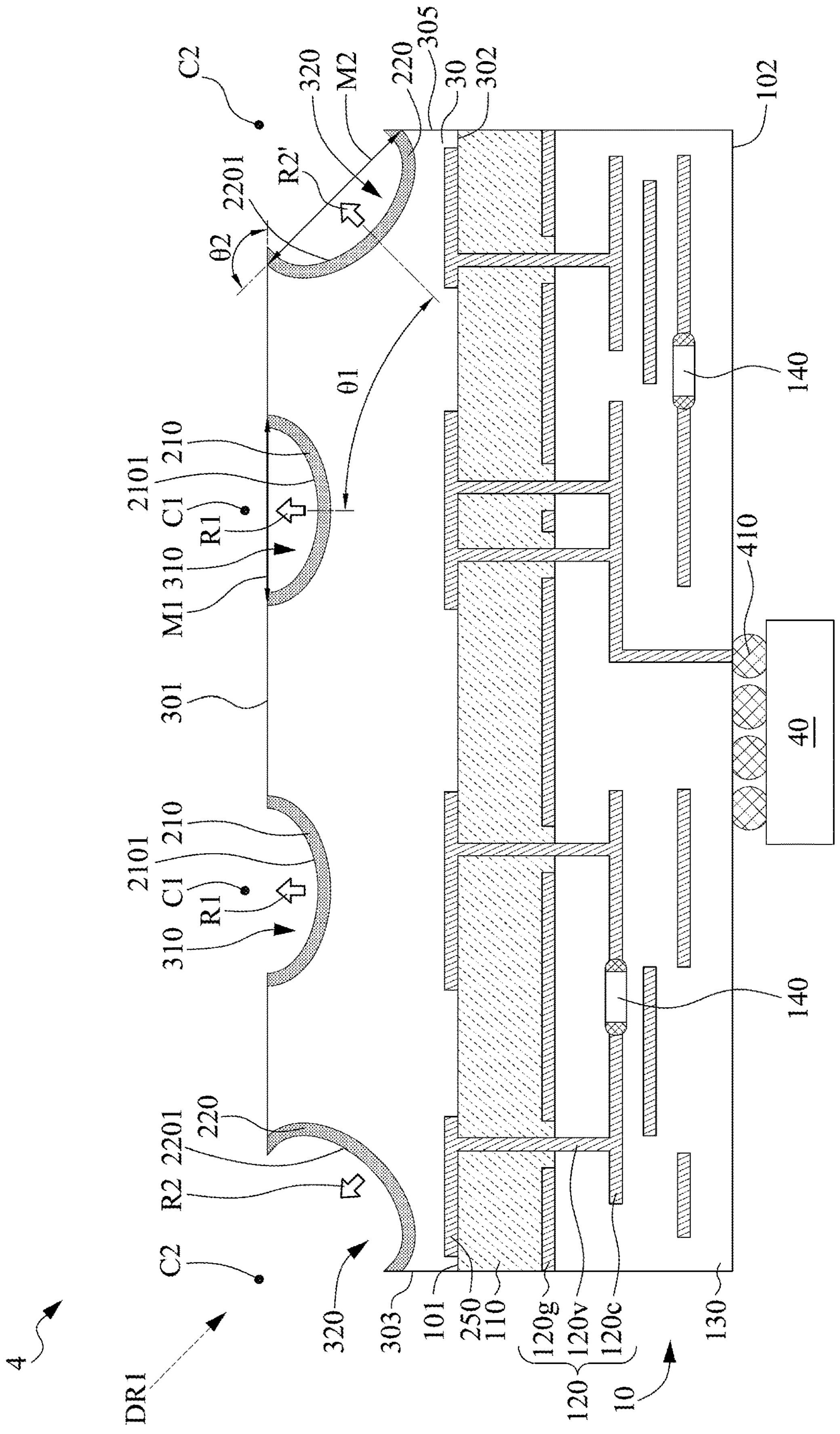
FIG. 4A is a cross-section of an electronic device in accordance with some embodiments of the present disclosure.
Figure 4B:
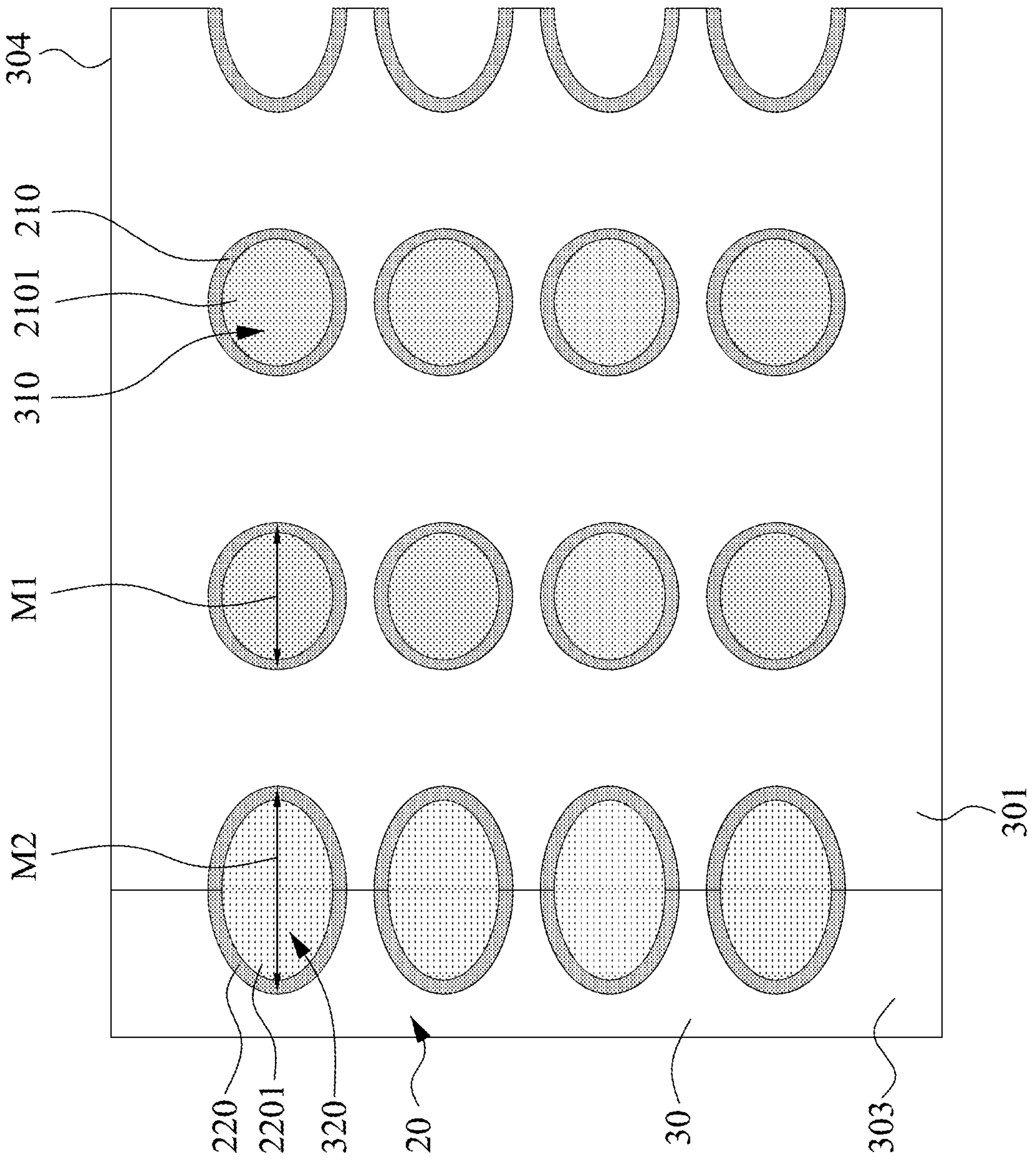
FIG. 4B is a side view of a portion of an electronic device in accordance with some embodiments of the present disclosure.
Figure 4C:
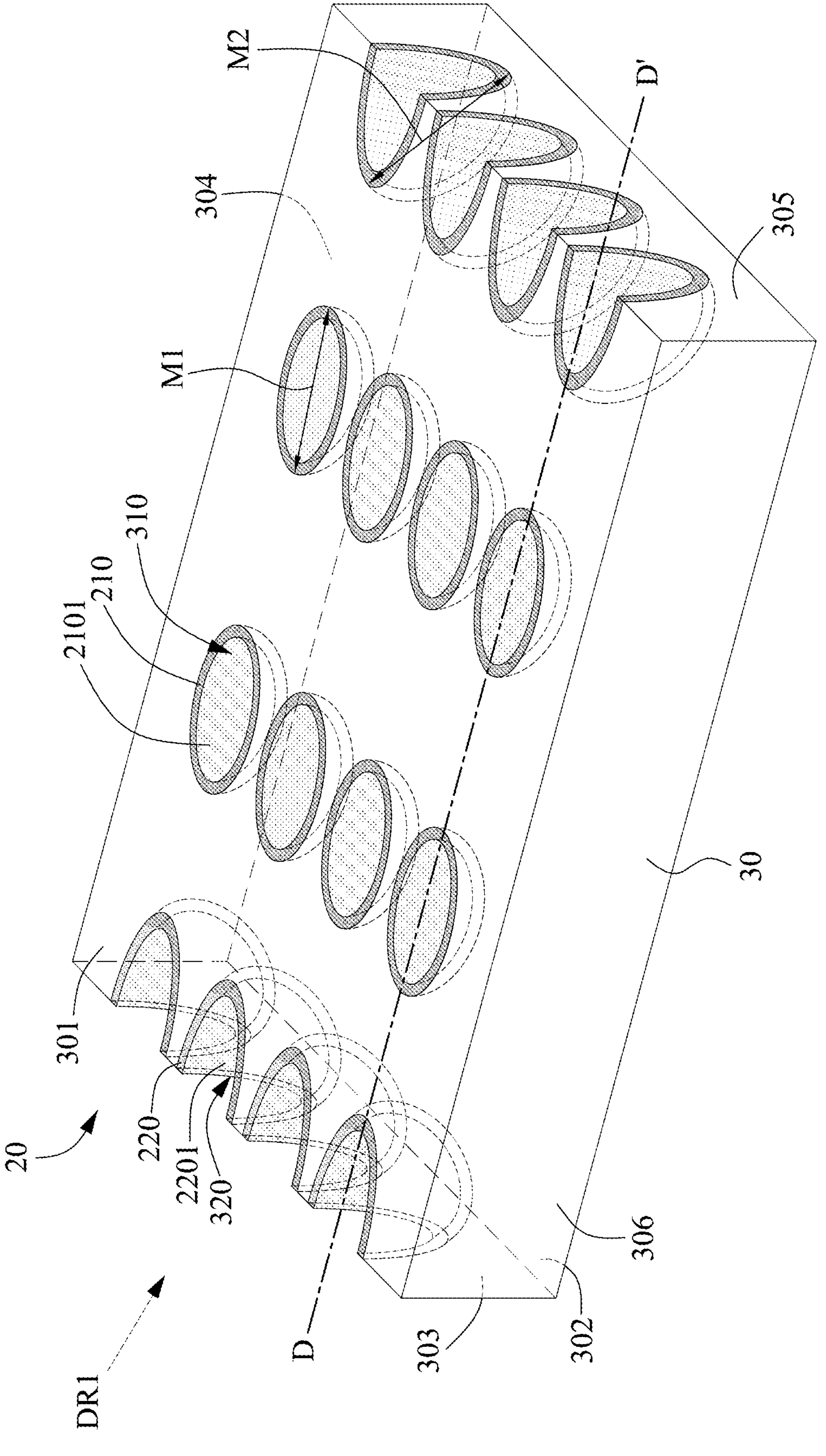
FIG. 4C is a stereoscopic diagram of a portion of an electronic device in accordance with some embodiments of the present disclosure.

FIG. 4A is a cross-section of an electronic device 4 in accordance with some embodiments of the present disclosure, FIG. 4B is a side view of a portion of an electronic device 4 in accordance with some embodiments of the present disclosure, and FIG. 4C is a stereoscopic diagram of a portion of an electronic device 4 in accordance with some embodiments of the present disclosure. It should be noted that some components/elements are omitted from FIGS. 4B-4C for clarity. In some embodiments, FIG. 4A is a cross-section along line D-D' in FIG. 4C. In some embodiments, FIG. 4B is a side view along angled orientation DR1 of FIG. 4A. The electronic device 4 is similar to the electronic device 1 in FIG. 1A, with differences therebetween as follows.

In some embodiments, the antenna array 20 of the electronic device 4 further includes one or more antenna patterns 220, and the antenna array 20 including a plurality of antenna patterns 210 and 220 are configured to increase an antenna gain of the antenna array 20. In some embodiments, each of the antenna patterns 220 includes a curved surface 2201 and a curvature center C2. In some embodiments, each of the antenna patterns 210 and 220 includes a curved surface 2101 and/or 2201 to be configured to increase an antenna gain of the antenna array 20. The curvature center C2 may be a focus of an ellipse or a center of a circle. In some embodiments, the curvature centers C1 and C2 are located above the surface 301 of the carrier 30. In some embodiments, the curvature centers C1 and C2 are located at different positions. In some embodiments, the curvature centers C1 and C2 are at different elevations with respect to the surface 301 of the carrier 30. In some embodiments, the curvature center C2 is at an elevation lower than an elevation of the curvature center C1. In some embodiments, a projection of the curvature center C1 of the antenna pattern 210 is free from overlapping the antenna pattern 220. In some embodiments, a projection of the curvature center C2 of the antenna pattern 220 is free from overlapping the surface 301 of the carrier 30. In some embodiments, the antenna patterns 220 may be or include dish antenna elements. In some embodiments, the antenna patterns 210 and 220 have bottom surfaces at different elevations with respect to the surface 301 of the carrier 30.

In some embodiments, the curved surface 2201 of the antenna pattern 220 extends from the surface 301 (or the top surface) to a lateral surface (e.g., the lateral surfaces 303 and 305) of the carrier 30. In some embodiments, the curved surface 2201 of the antenna pattern 220 is recessed from the surface 301 (or the top surface) and the lateral surface (e.g., the lateral surfaces 303 and 305) of the carrier 30. In some embodiments, the carrier 30 has a surface 302 (also referred to as "a bottom surface") opposite to the surface 301, and the curved surface 2201 of the antenna pattern 220 is closer to the surface 302 of the carrier 30 than the curved surface 2101 of the antenna pattern 210.

In some embodiments, the antenna pattern 220 located on opposite sides of the antenna patterns 210 are configured to radiate EM radiation in radiation directions R2 and R2'. In some embodiments, the radiation direction R1 is different from the radiation direction R2 and R2'. In some embodiments, the EM radiations in the radiation directions R1 and R2 are configured to conduct a far-field interference. In some embodiments, the EM radiations in the radiation directions R1 and R2' are configured to conduct a far-field interference. The radiation direction R2 may be parallel to the angled orientation DR1. In some embodiments, the radiation direction R1 of the antenna pattern 210 and the radiation direction R2 of the antenna pattern 220 are free from overlapping. In some embodiments, an angle θ1 defined by the radiation direction R1 of the antenna pattern 210 and the radiation direction R2 of the antenna pattern 220 exceeds 0° and less than or equal to about 45°. In some embodiments, the angle θ1 may be less than or equal to about 45°, 40°, 35°, 30°, 25°, 20°, 15°, 10°, or 5°. In some embodiments, an angle θ2 defined by a major axis M1 of the antenna pattern 210 and a major axis M2 of the antenna pattern 220 is equal to or greater than 135° and less than about 180°. In some embodiments, the angle θ2 may be about 135°, 140°, 145°, 150°, 155°, 160°, 165°, 170°, or 175°. In some embodiments, the antenna patterns 210 and 220 together function as a set of antennas configured to conduct a far-field interference. In some embodiments, the antenna patterns 210 and 220 together function as a set of antennas collectively configured to provide a scan-angle coverage (e.g., scanning area or scanning angle). In some other embodiments, the angle θ1 may exceed about 45°, and/or the angle θ2 may be less than about 135'; thus, the antenna patterns 210 and the antenna patterns 220 may function as different sets of antennas configured to provide different scan-angle coverages (e.g., scanning areas or scanning angles). For example, the antenna patterns 220 located on opposite sides of the antenna patterns 210 may function as two sets of antennas configured to provide different scan-angle coverages, and the antenna patterns 210 function as a third set of antennas. The scan-angle coverage may refer to a transmitting range and/or a receiving range.

In some embodiments, the carrier 30 further has one or more recesses 320 recessed from the surface 301 (or the top surface) and the lateral surface (e.g., the lateral surfaces 303 and 305) of the carrier 30. In some embodiments, the antenna pattern 220 is disposed in the recess 320. In some embodiments, each of the antenna patterns 220 is disposed in a corresponding recess 320. In some embodiments, the antenna pattern 220 is conformal to a concave surface of the corresponding recess 320 of the carrier 30. In some embodiments, the antenna pattern 220 fully covers an inner surface of the corresponding recess 320. In some embodiments, the antenna pattern 220 has a shape substantially the same as that of the corresponding recess 320. In some embodiments, each of the antenna patterns 220 has a shape substantially the same as that of the corresponding recess 320. The recesses 310 and 320 may differ in depth, size, shape, or a combination thereof. In some embodiments, the recesses 320 may be or include dish-shaped recesses. In some embodiments, a projection of the curvature center C1 of the antenna pattern 210 is free from overlapping the recess 320.

In some embodiments, electromagnetic radiations from the antenna patterns 210 and 220 are configured to conduct a far-field interference. In some embodiments, electromagnetic radiations from the curved surfaces 2101 and 2201 of the antenna patterns 210 and 220 are configured to conduct a far-field interference. In some embodiments, electromagnetic radiations from the antenna patterns 210 and 220 are configured to conduct a far-field interference to achieve the desired function of the antenna array 20, e.g., by generating a desired wave pattern of the EM field, adjusting a desired amplitude of the EM field, and/or other characteristics of the far-field region of the EM field. According to some embodiments of the present disclosure, with the design of the antenna patterns 210 and 220 of the antenna array 20, the antenna gain can be increased, especially the antenna gain in a far-field region, which is advantageous to the radiation performance of the antenna array 20.

In addition, according to some embodiments of the present disclosure, with the design of the antenna patterns 210 and the antenna patterns 220 having different radiation directions R1 and R2, not only can the antenna gains be increased, but the scan-angle coverage (e.g., scanning area or scanning angle) can also be increased. For example, the scanning angle may be increased by about ±45°. Moreover, according to some embodiments of the present disclosure, by varying the angle θ1 and/or the angle θ2, the combination of sets of antennas with varying scan-angle coverages can vary according to actual application, and thus the design flexibility of antenna structure can be increased.

Furthermore, according to some embodiments of the present disclosure, with the design of the antenna patterns 220 recessed from the top surface and the lateral surface of the carrier 30, the x-y dimension of the electronic device 4 can be reduced.

Figure 4D:
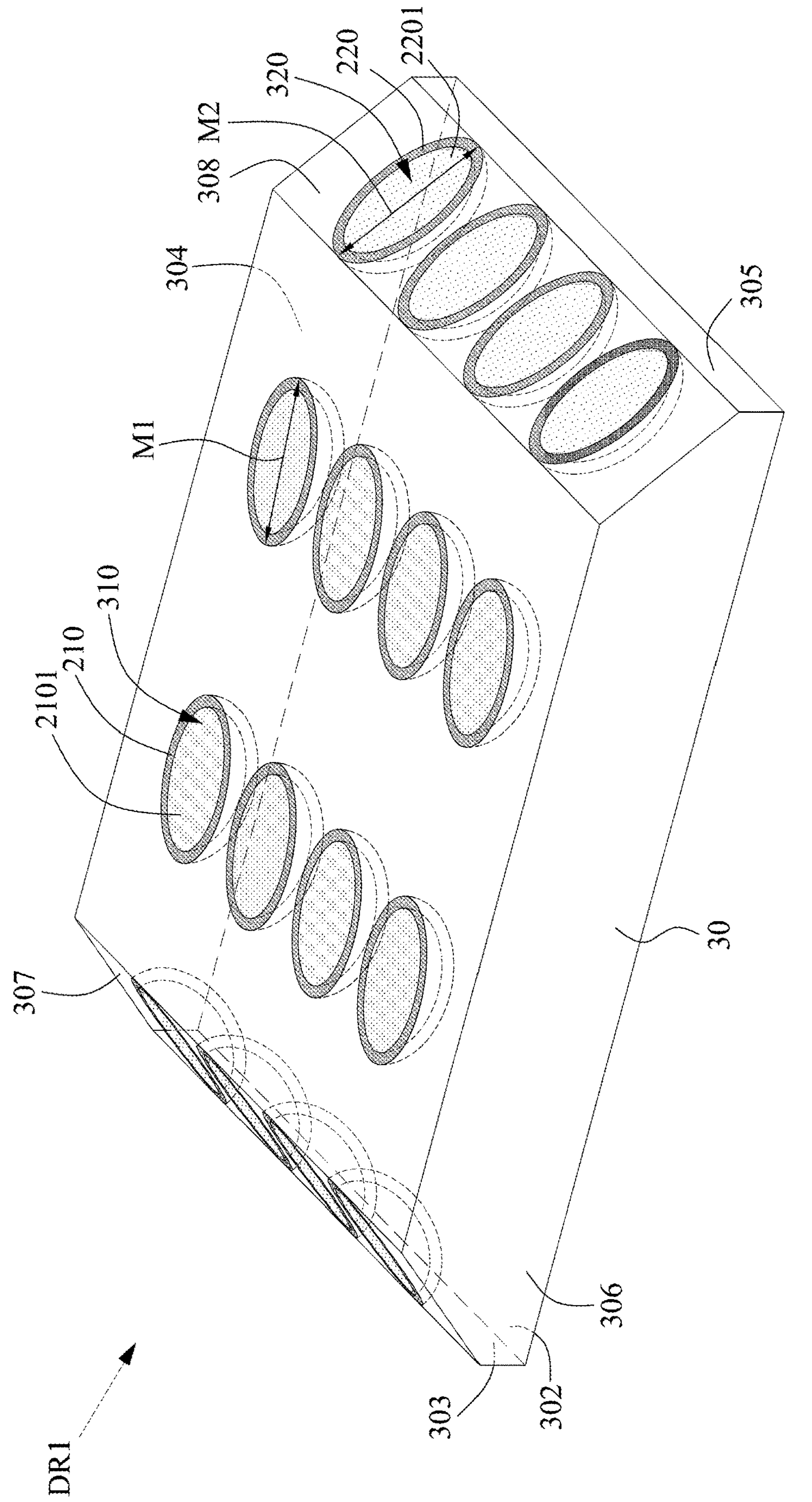
FIG. 4D is a stereoscopic diagram of a portion of an electronic device in accordance with some embodiments of the present disclosure.

FIG. 4D is a stereoscopic diagram of a portion of an electronic device in accordance with some embodiments of the present disclosure. The structure of FIG. 4D is similar to that in FIG. 4C, with differences therebetween as follows.

In some embodiments, the carrier 30 further has inclined surfaces 307 and 308. In some embodiments, the surface 307 extends between the surface 301 and the surface 303, and the surface 308 extends between the surface 301 and the surface 305. In some embodiments, the recesses 320 are recessed from the surface 307 or the surface 308. In some embodiments, the major axis M2 of the antenna pattern 220 is substantially parallel to the surface 307 or the surface 308. In some embodiments, the radiation direction R1 of the antenna pattern 20 is substantially perpendicular to the surface 307 or the surface 308.

Figure 5A:
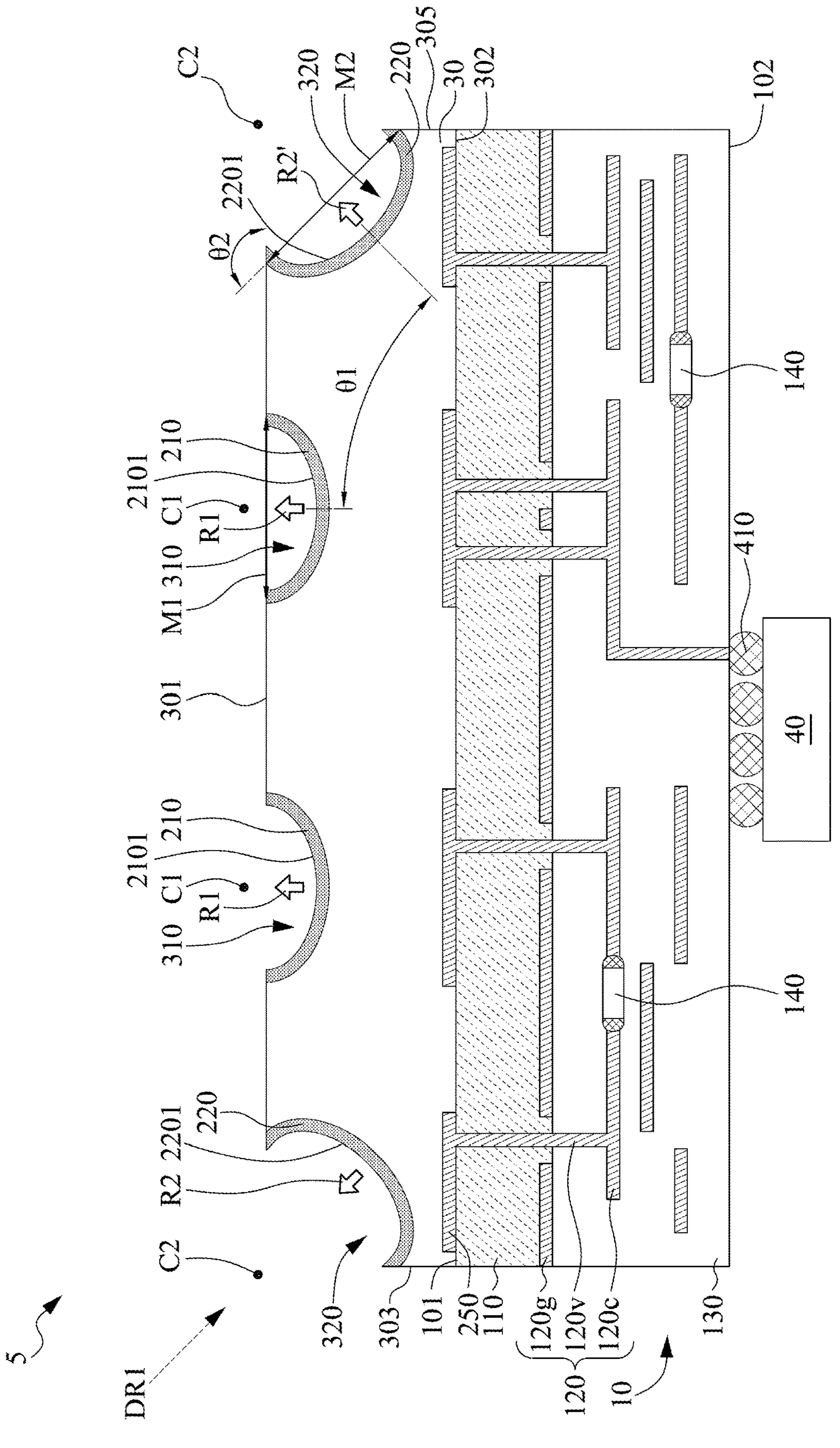
FIG. 5A is a cross-section of an electronic device in accordance with some embodiments of the present disclosure.
Figure 5B:
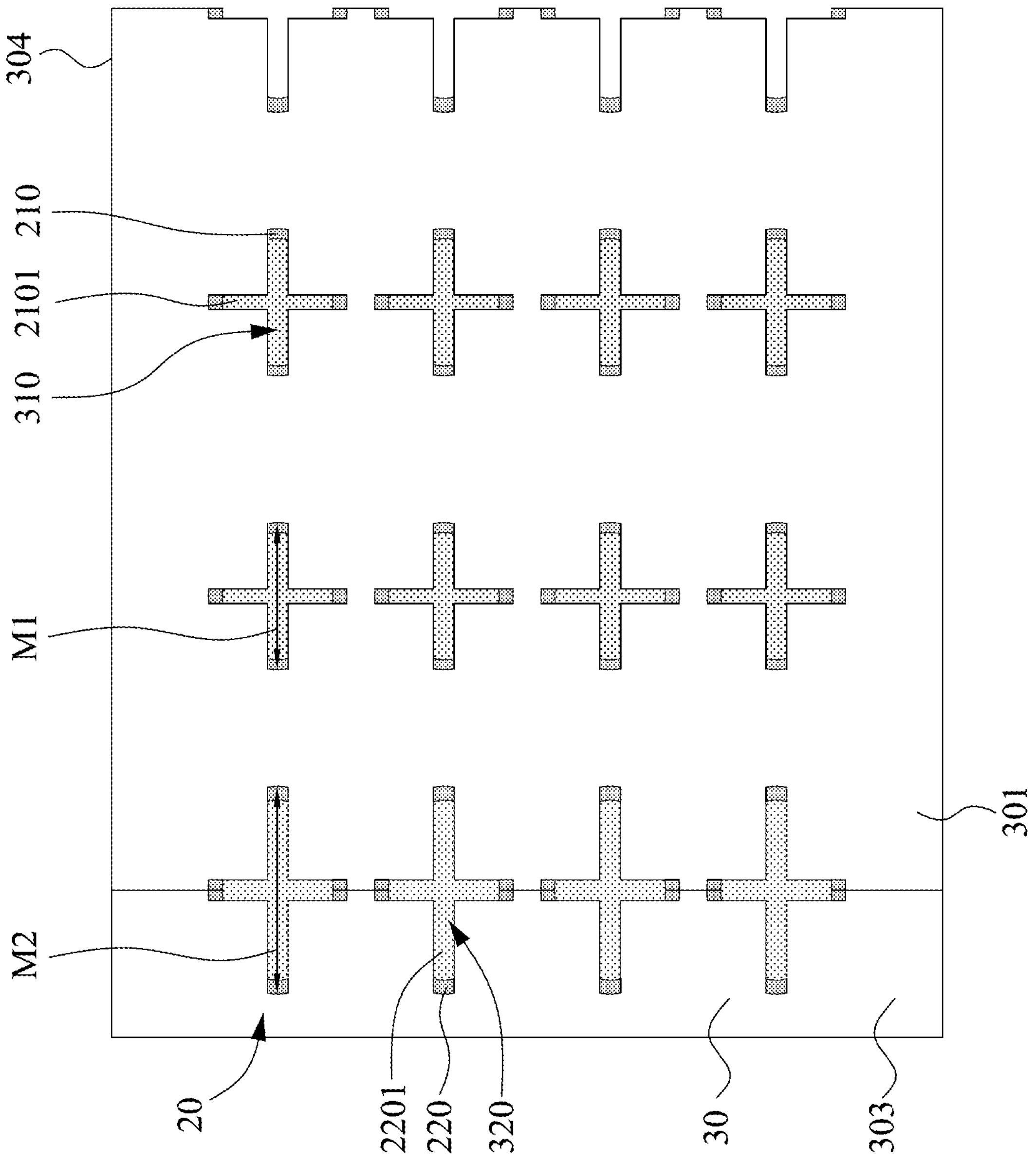
FIG. 5B is a side view of a portion of an electronic device in accordance with some embodiments of the present disclosure.
Figure 5C:
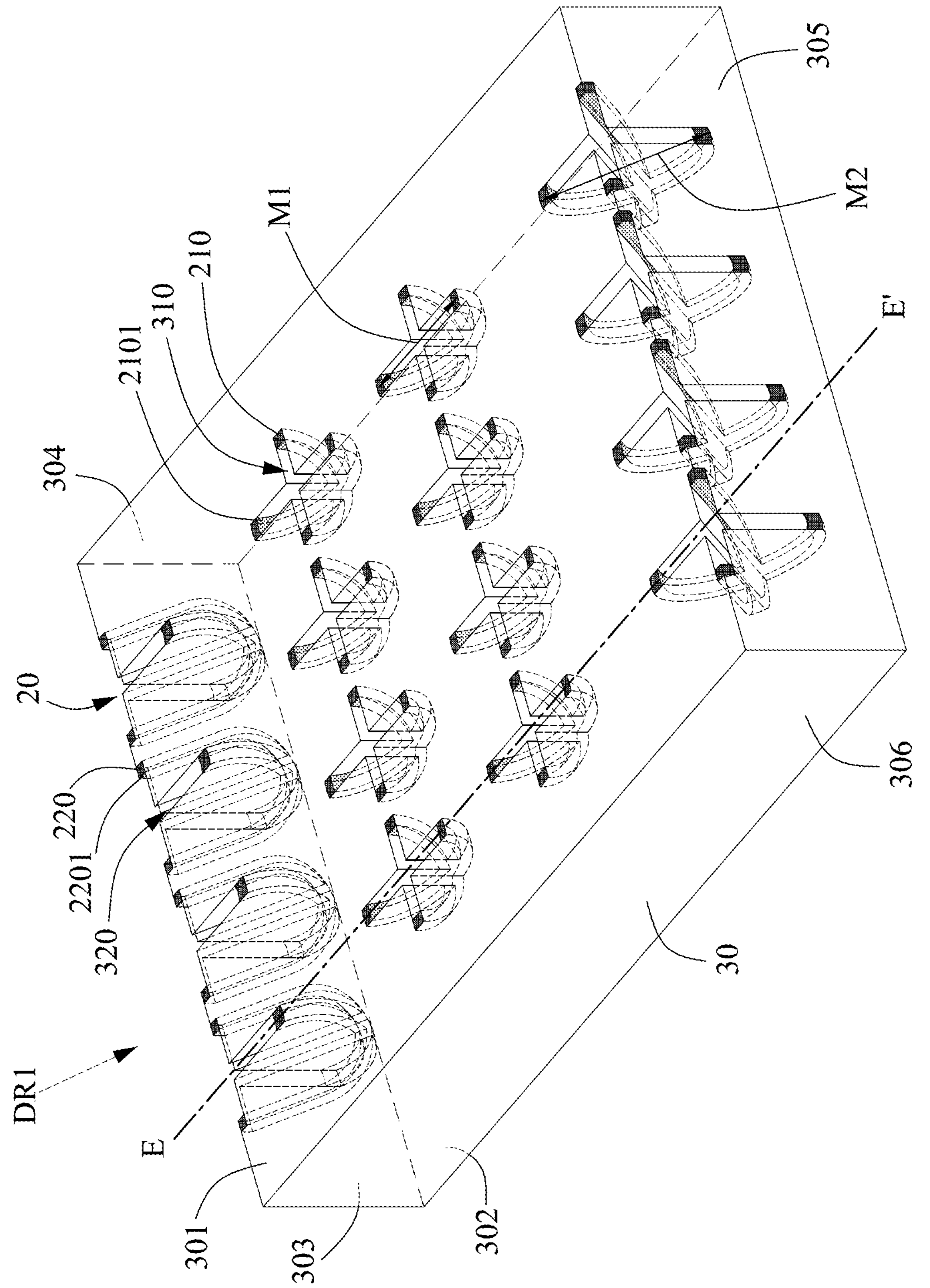
FIG. 5C is a stereoscopic diagram of a portion of an electronic device in accordance with some embodiments of the present disclosure.

FIG. 5A is a cross-section of an electronic device 5 in accordance with some embodiments of the present disclosure, FIG. 5B is a side view of a portion of an electronic device 5 in accordance with some embodiments of the present disclosure, and FIG. 5C is a stereoscopic diagram of a portion of an electronic device 5 in accordance with some embodiments of the present disclosure. It should be noted that some components/elements are omitted from FIGS. 5B-5C for clarity. In some embodiments, FIG. 5A is a cross-section along line E-E' in FIG. 5C. In some embodiments, FIG. 5B is a side view along angled orientation DR1 of FIG. 5A. The electronic device 5 is similar to the electronic device 4 in FIG. 4A, with differences therebetween as follows.

In some embodiments, the recesses 320 may be or include cross-shaped recesses. In some embodiments, at least two of the antenna patterns 220 are in the recesses 320 having cross shapes. In some embodiments, the antenna pattern 220 partially covers an inner surface of the corresponding recess 320. In some embodiments, a bottom surface of the antenna pattern 220 is conformal to a cross-shaped concave surface of the corresponding recess 320. In some embodiments, an inner bottom surface (or an inner concave surface) of the recess 320 is covered by the antenna pattern 220, and an inner sidewall of the recess 320 is exposed by the antenna pattern 220. In some embodiments, the antenna pattern 220 includes a cross-shaped antenna element. In some embodiments, the cross-shaped antenna element extends between the surface 301 and the surface 303 of the carrier 30. In some embodiments, the antenna patterns 220 may be or include dual polarized antenna elements.

Figure 6A:
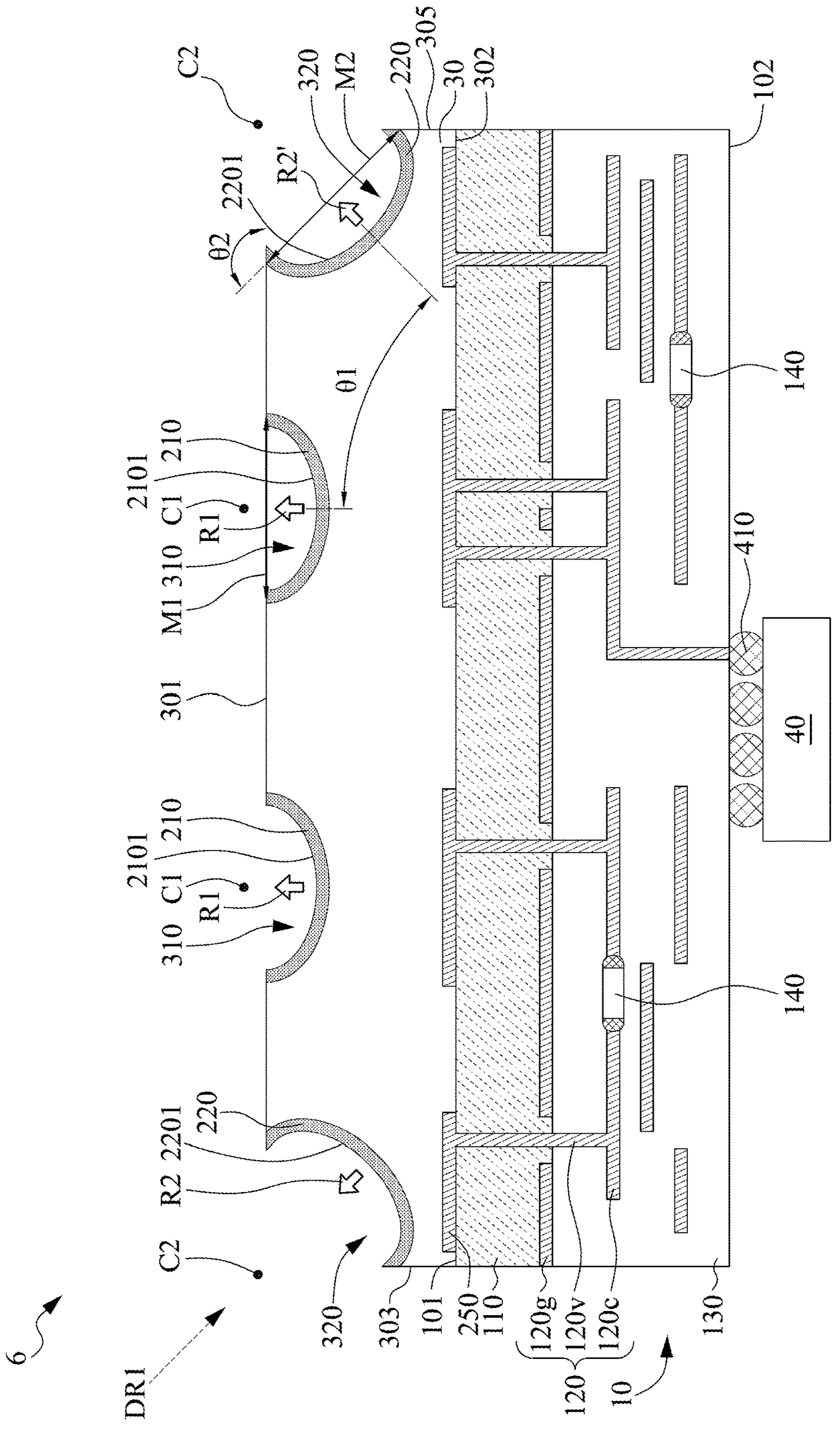
FIG. 6A is a cross-section of an electronic device in accordance with some embodiments of the present disclosure.
Figure 6B:
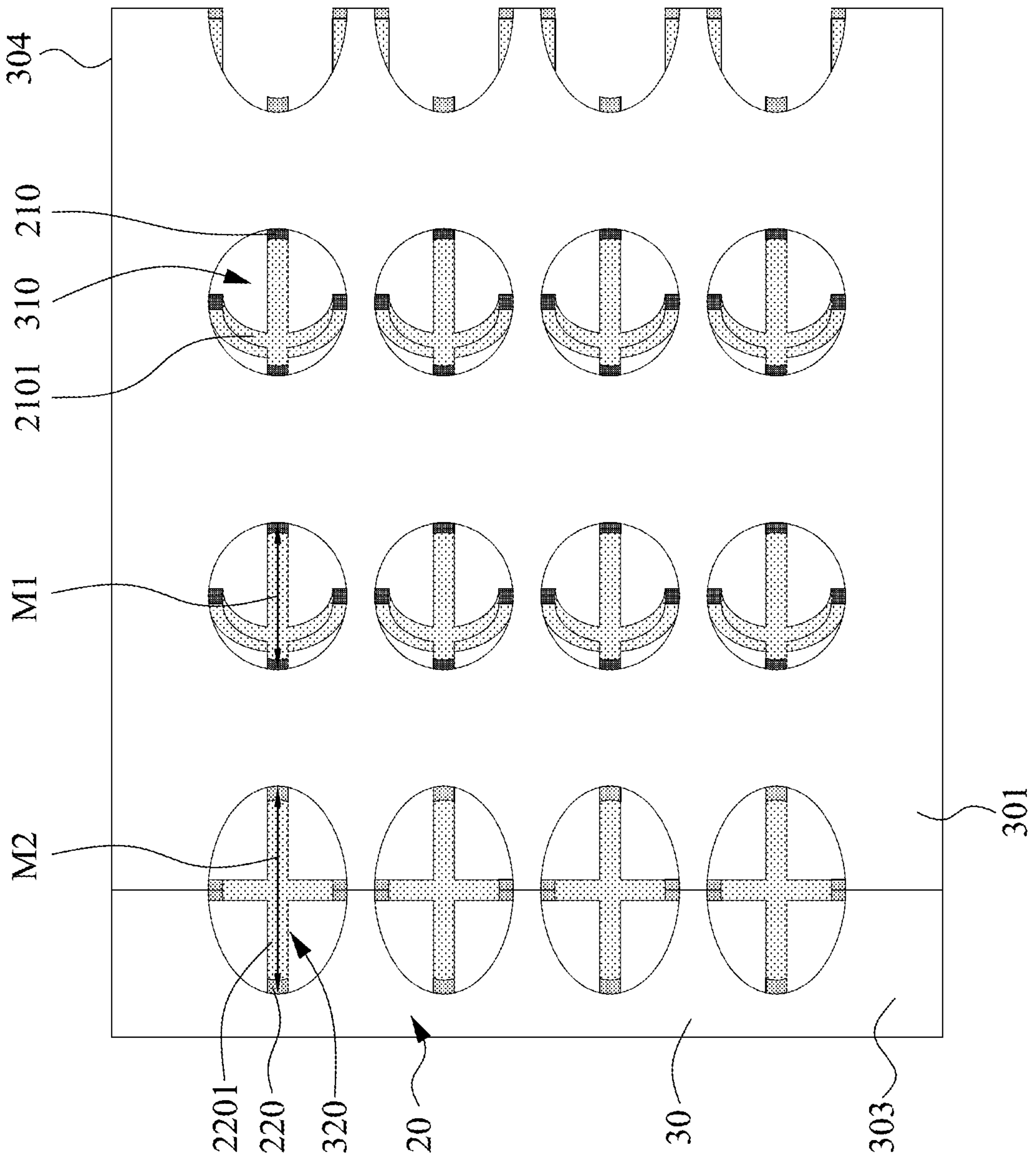
FIG. 6B is a side view of a portion of an electronic device in accordance with some embodiments of the present disclosure.
Figure 6C:
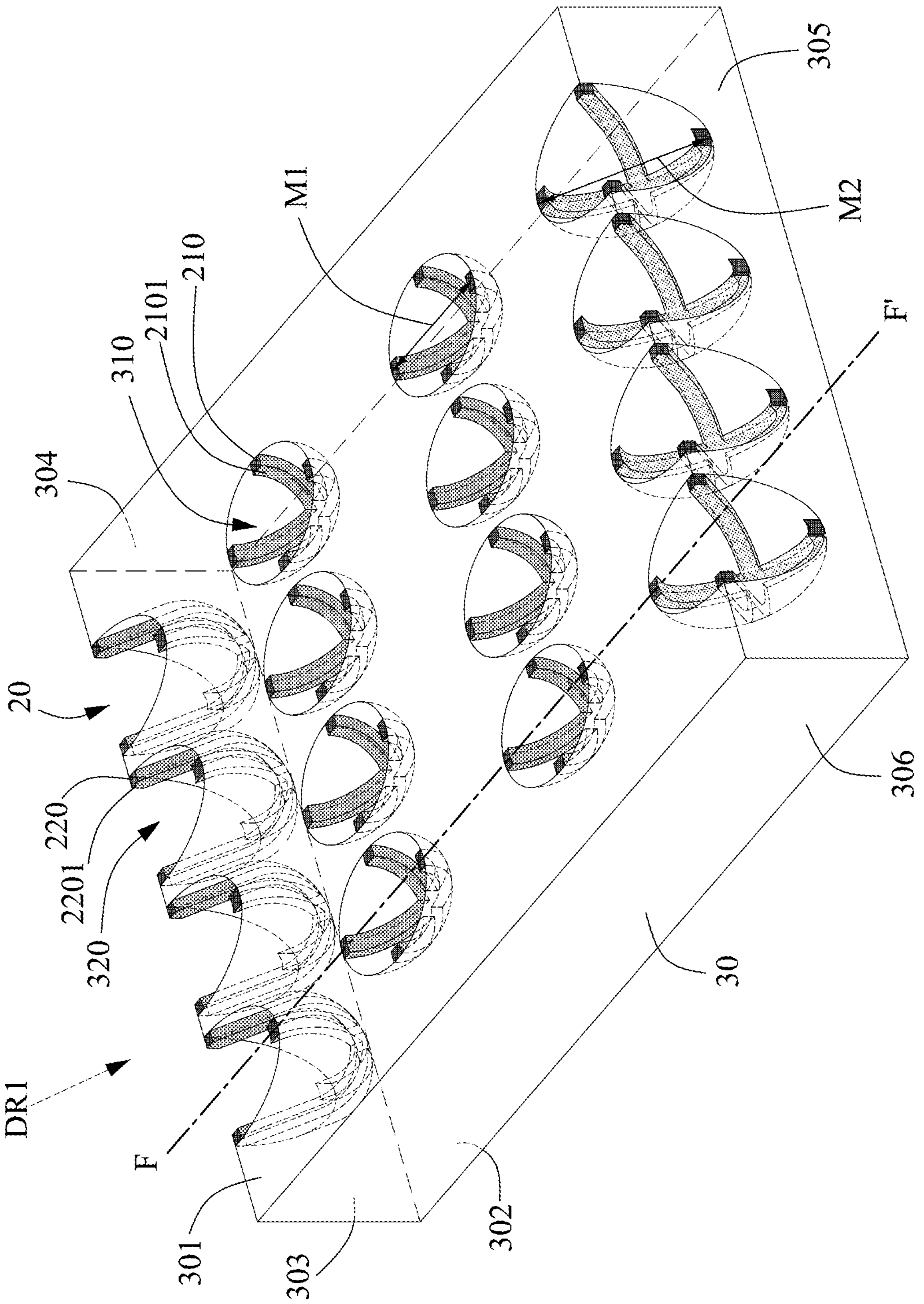
FIG. 6C is a stereoscopic diagram of a portion of an electronic device in accordance with some embodiments of the present disclosure.

FIG. 6A is a cross-section of an electronic device 6 in accordance with some embodiments of the present disclosure, FIG. 6B is a side view of a portion of an electronic device 6 in accordance with some embodiments of the present disclosure, and FIG. 6C is a stereoscopic diagram of a portion of an electronic device 6 in accordance with some embodiments of the present disclosure. It should be noted that some components/elements are omitted from FIGS. 6B-6C for clarity. In some embodiments, FIG. 6A is a cross-section along line F-F' in FIG. 6C. In some embodiments, FIG. 6B is a side view along angled orientation DR1 of FIG. 6A. The electronic device 6 is similar to the electronic device 4 in FIG. 4A, with differences therebetween as follows.

In some embodiments, the antenna pattern 220 includes a cross-shaped antenna element. In some embodiments, the recesses 320 may be or include dish-shaped recesses. In some embodiments, at least two of the antenna patterns 220 having cross shapes are in the recesses 320. In some embodiments, the antenna pattern 220 partially covers an inner surface of the corresponding recess 320. In some embodiments, the antenna pattern 220 partially covers a curved surface (or an inner concave surface) of the corresponding recess 320. In some embodiments, each of the antenna patterns 220 partially covers a curved surface of the corresponding recess 320. In some embodiments, a bottom surface of the antenna pattern 220 is conformal to a portion of a concave surface of the corresponding recess 320. In some embodiments, the antenna patterns 220 may be or include dual polarized antenna elements.

Figure 7A:
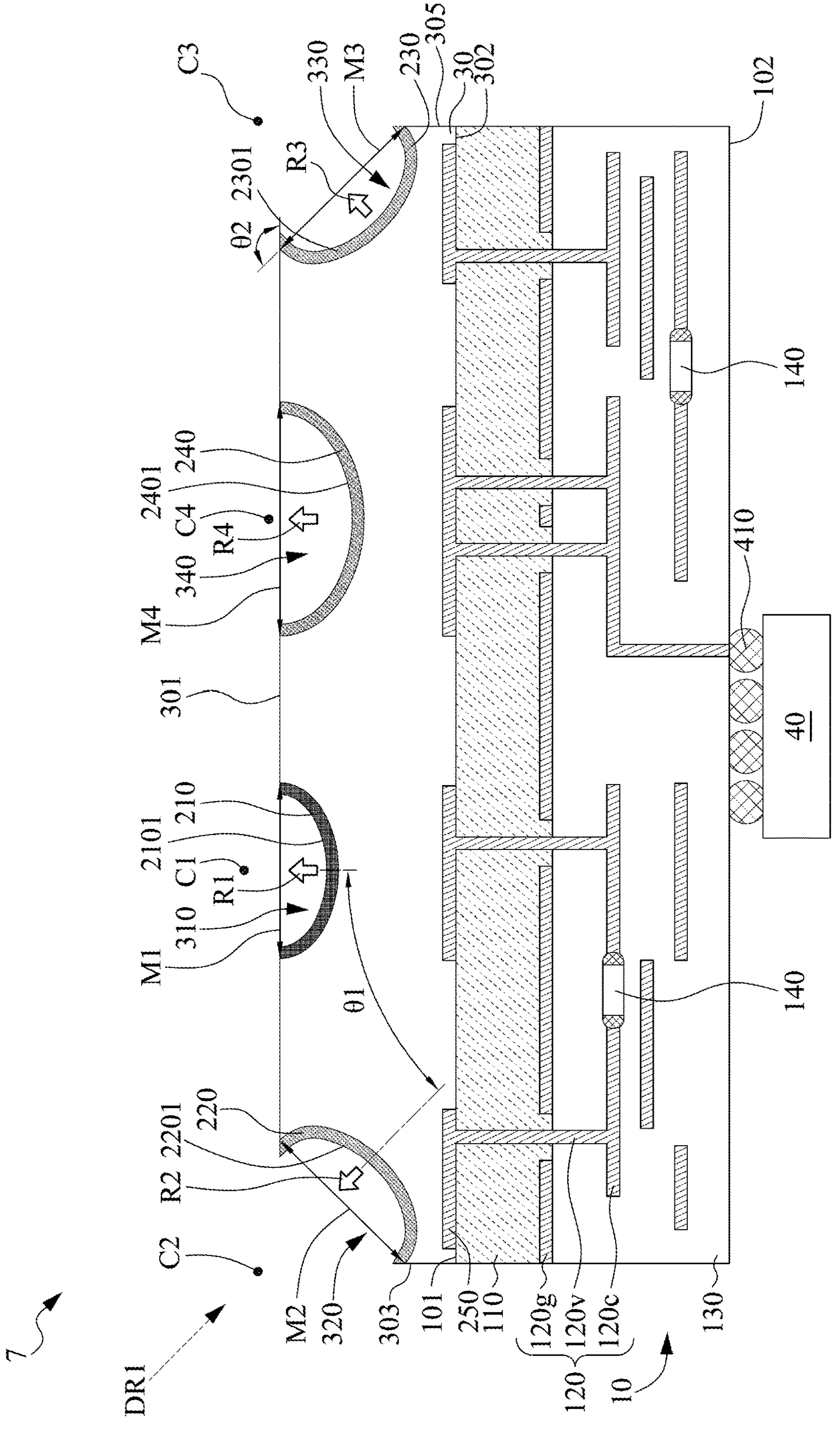
FIG. 7A is a cross-section of an electronic device in accordance with some embodiments of the present disclosure.
Figure 7B:
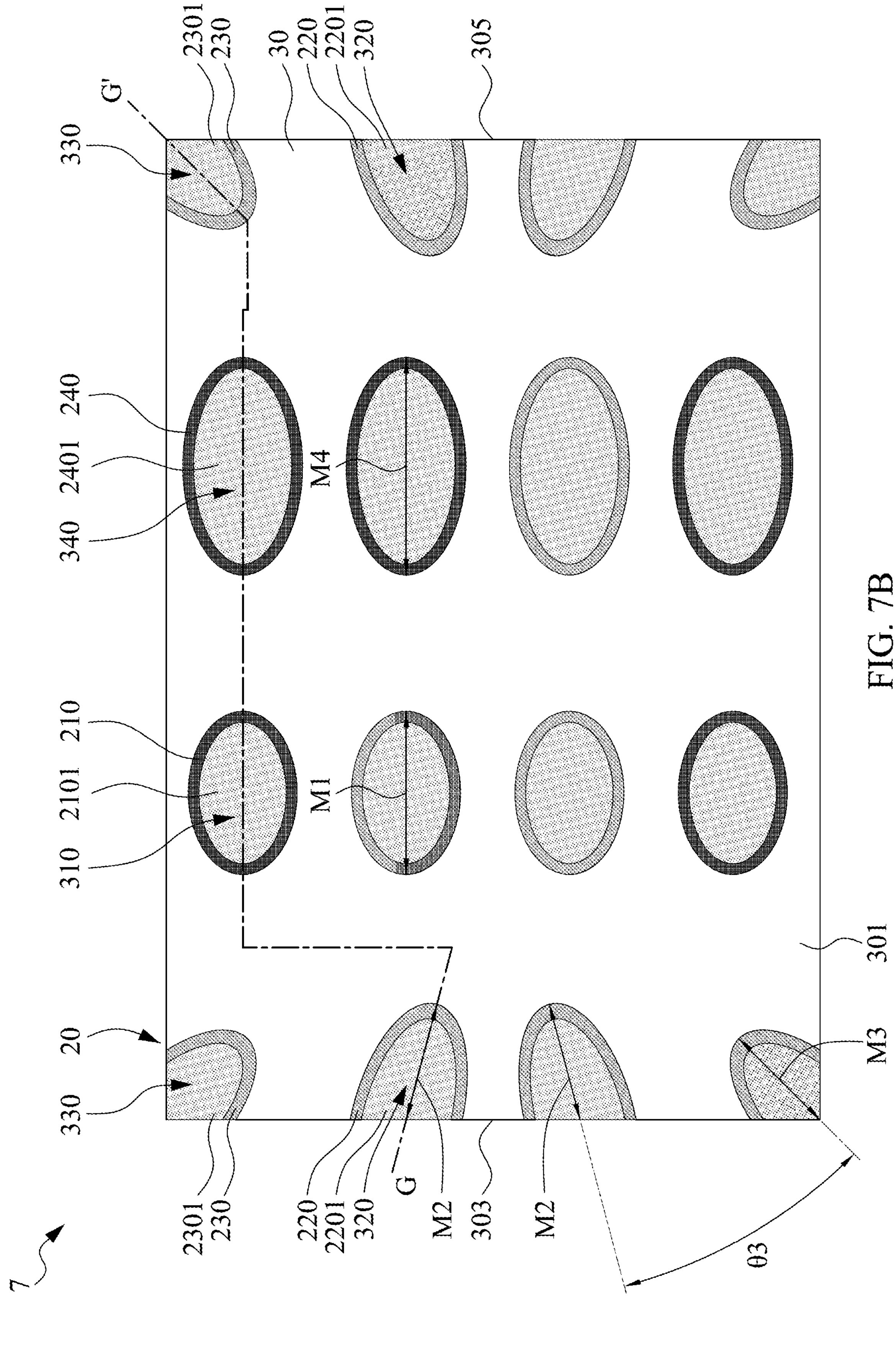
FIG. 7B is a top view of an electronic device in accordance with some embodiments of the present disclosure.
Figure 7C:
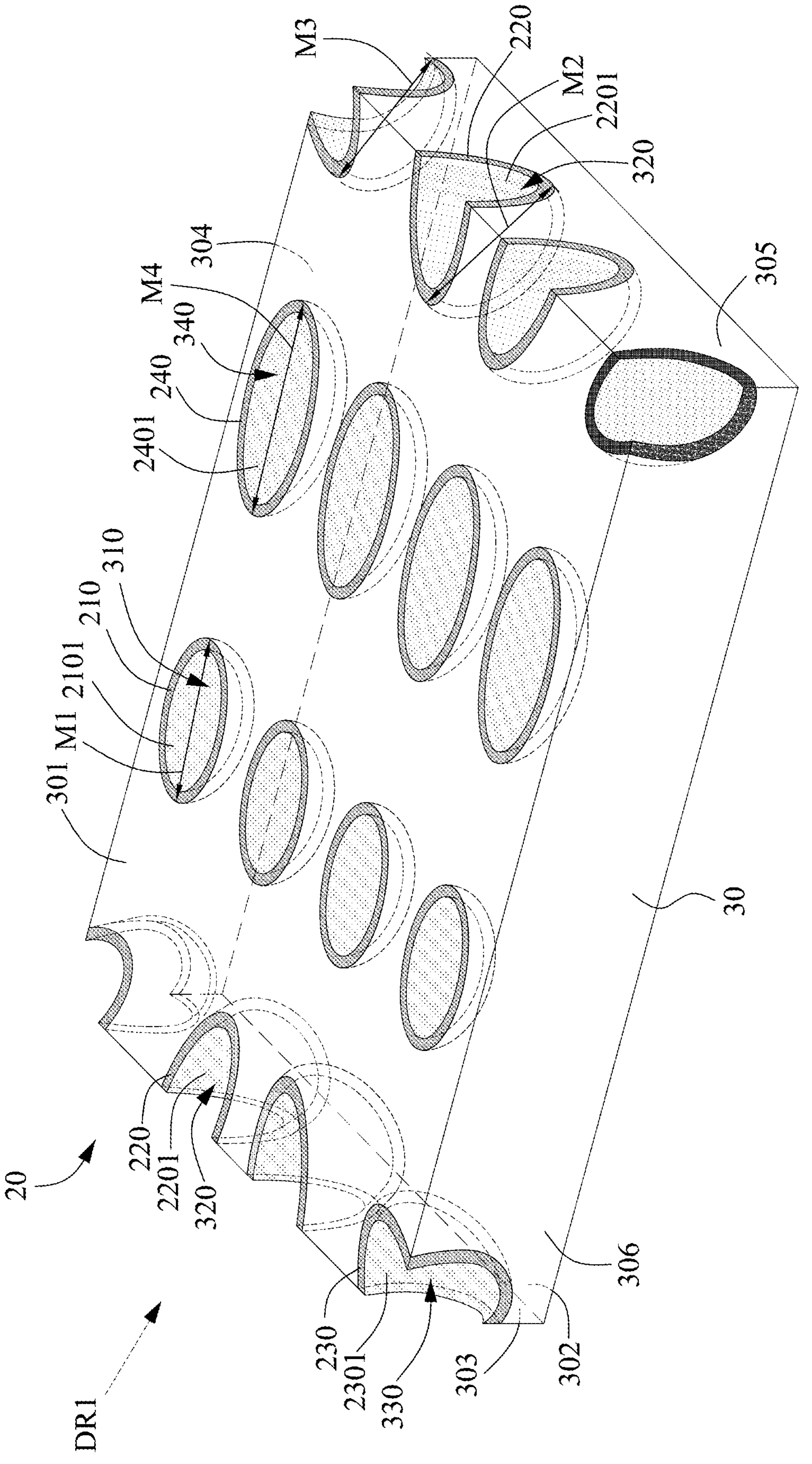
FIG. 7C is a stereoscopic diagram of a portion of an electronic device in accordance with some embodiments of the present disclosure.

FIG. 7A is a cross-section of an electronic device 7 in accordance with some embodiments of the present disclosure, FIG. 7B is a top view of an electronic device 7 in accordance with some embodiments of the present disclosure, and FIG. 7C is a stereoscopic diagram of a portion of an electronic device 7 in accordance with some embodiments of the present disclosure. It should be noted that some components/elements are omitted from FIG. 7C for clarity. In some embodiments, FIG. 7A is a cross-section along line G-G' in FIG. 7B. The electronic device 7 is similar to the electronic device 4 in FIG. 4A, with differences therebetween as follows.

In some embodiments, the antenna array 20 of the electronic device 7 further includes one or more antenna patterns 230 and 240. In some embodiments, the antenna array 20 including a plurality of antenna patterns 210 to 240 are configured to increase an antenna gain of the antenna array 20.

In some embodiments, each of the antenna patterns 230 includes a curved surface 2301 and a curvature center C3. The curvature center C3 may be a focus of an ellipse or a center of a circle. In some embodiments, each of the antenna patterns 240 includes a curved surface 2401 and a curvature center C4. The curvature center C4 may be a focus of an ellipse or a center of a circle. In some embodiments, the antenna pattern 210 and the antenna pattern 240 have different curvatures. In some embodiments, each of the antenna patterns 210 to 240 includes a curved surface 2101, 2201, 2301 and/or 2401 to be configured to increase an antenna gain of the antenna array 20. In some embodiments, the curvature centers C1 to C4 are located at different positions. In some embodiments, at least two of the curvature centers C1 to C4 are at different elevations with respect to the surface 301 of the carrier 30. In some embodiments, the curvature centers C1 to C4 are located above the surface 301 of the carrier 30. In some embodiments, a projection of at least one or both of the curvature centers C2 and C3 is free from overlapping the surface 301 of the carrier 30. In some embodiments, the antenna patterns 230 and 240 may be or include dish antenna elements. In some embodiments, at least two or more of the antenna patterns 210, 220, 230, and 240 have bottom surfaces at different elevations with respect to the surface 301 of the carrier 30.

In some embodiments, the curved surface 2301 of the antenna pattern 230 extends between the surface 301 (or the top surface) and two adjacent lateral surfaces (e.g., the lateral surfaces 303 and 304, the lateral surfaces 304 and 305, the lateral surfaces 305 and 306, or the lateral surfaces 303 and 306) of the carrier 30. In some embodiments, the curved surface 2301 of the antenna pattern 230 is recessed from the surface 301 (or the top surface) and two adjacent lateral surfaces (e.g., the lateral surfaces 303 and 304, the lateral surfaces 304 and 305, the lateral surfaces 305 and 306, or the lateral surfaces 303 and 306) of the carrier 30. In some embodiments, the curved surface 2301 of the antenna pattern 230 is closer to the surface 302 of the carrier 30 than the curved surface 2101 of the antenna pattern 210 is.

In some embodiments, the curved surface 2401 of the antenna pattern 240 is recessed from the surface 301 (or the top surface) of the carrier 30. In some embodiments, the antenna pattern 240 is configured to radiate EM radiation in a radiation direction R4. In some embodiments, the radiation direction R4 is different from the radiation directions R1, R2 and R3. In some embodiments, the radiation directions R4 of the antenna pattern 240 are substantially perpendicular to the surface 301 (or the top surface) of the carrier 30. In some embodiments, the curved surface 2401 of the antenna pattern 240 is between the lateral surface 303 and the lateral surface 305 of the carrier 30. In some embodiments, the curved surface 2401 of the antenna pattern 240 is between the lateral surface 304 and the lateral surface 306 of the carrier 30.

In some embodiments, the antenna pattern 230 is configured to radiate EM radiation in a radiation direction R3. In some embodiments, the radiation direction R3 is different from the radiation directions R1 and R2. In some embodiments, the radiation direction R3 of the antenna pattern 230 is non-parallel to the radiation direction R1 of the antenna patterns 210. In some embodiments, the radiation direction R3 of the antenna pattern 230 is non-parallel to the radiation direction R2 of the antenna patterns 220. In some embodiments, the radiation direction R2 of the antenna pattern 220 and the radiation direction R3 of the antenna pattern 230 are free from overlapping each other. In some embodiments, an angle θ3 defined by a major axis M2 of the antenna pattern 220 and a major axis M3 of the antenna pattern 230 exceeds 0° and less than or equal to about 45°. In some embodiments, the angle θ3 may be about 5°, 10°, 15°, 20°, 25°, 30°, 35°, 40°, or 45°. In some embodiments, at least two radiation directions R2 of two adjacent antenna patterns 220 are non-parallel.

In some embodiments, the carrier 30 further has one or more recesses 330 recessed from the surface 301 (or the top surface) and two adjacent lateral surfaces (e.g., the lateral surfaces 303 and 304, the lateral surfaces 304 and 305, the lateral surfaces 305 and 306, or the lateral surfaces 303 and 306) of the carrier 30. In some embodiments, the antenna pattern 230 is disposed in the recess 330. In some embodiments, each of the antenna patterns 230 is disposed in a corresponding recess 330. In some embodiments, the antenna pattern 230 is conformal to a concave surface of the corresponding recess 330 of the carrier 30. In some embodiments, the antenna pattern 230 fully covers an inner surface of the corresponding recess 330. In some embodiments, the antenna pattern 230 has a shape substantially the same as that of the corresponding recess 330. In some embodiments, each of the antenna patterns 230 has a shape substantially the same as that of the corresponding recess 330. In some embodiments, the recesses 330 may be or include dish-shaped recesses. In some embodiments, a projection of the curvature center C1 of the antenna pattern 210 is free from overlapping the recess 330.

In some embodiments, the carrier 30 further has one or more recesses 340 recessed from the surface 301 of the carrier 30. In some embodiments, the antenna pattern 240 is disposed in the recesses 340. In some embodiments, the antenna pattern 240 is disposed in a corresponding recess 340. In some embodiments, each of the antenna patterns 240 is disposed in a corresponding recess 340. In some embodiments, the antenna pattern 240 is conformal to a concave surface of the corresponding recess 340 of the carrier 30. In some embodiments, the antenna pattern 240 fully covers an inner surface of the corresponding recess 340. In some embodiments, the antenna pattern 240 has a shape substantially the same as that of the corresponding recess 340. In some embodiments, each of the antenna patterns 240 has a shape substantially the same as that of the corresponding recess 340. The recesses 310, 310, 320, and 340 may differ in depth, size, shape, or a combination thereof. In some embodiments, a depth and/or a size of the recess 340 exceeds a depth of the recesses 310. In some embodiments, the recesses 340 may be or include dish-shaped recesses. In some embodiments, a projection of the curvature center C1 of the antenna pattern 210 is free from overlapping the recess 340.

In some embodiments, electromagnetic radiations from the antenna patterns 210, 220, 230, and 240 are configured to conduct a far-field interference. In some embodiments, electromagnetic radiations from the curved surfaces 2101, 2201, 2301, and 2401 of the antenna patterns 210, 220, 230, and 240 are configured to conduct a far-field interference. In some embodiments, electromagnetic radiations from the antenna patterns 210, 220, 230, and 240 are configured to conduct a far-field interference to achieve the desired function of the antenna array 20, e.g., by generating a desired wave pattern of the EM field, adjusting a desired amplitude of the EM field, and/or other characteristics of the far-field region of the EM field. According to some embodiments of the present disclosure, with the design of the antenna patterns 210, 220, 230, and 240 of the antenna array 20, the antenna gain can be increased, and the scanning area can be increased as well.

In some embodiments, the antenna patterns antenna patterns 210, 220, 230, and 240 together function as a set of antennas configured to provide a scan-angle coverage (e.g., scanning area or scanning angle). In some other embodiments, the angle θ1 may exceed about 45°, and/or the angle θ2 may be less than about 135°, whereby the antenna patterns 210, 220, 230, and 240 may function as different sets of antennas configured to provide different scan-angle coverages (e.g., scanning areas or scanning angles). For example, the antenna patterns 220 and 230 located on opposite sides of the antenna patterns 210 and 240 may function as two sets of antennas configured to provide different scan-angle coverages, and the antenna patterns 210 and 240 function as a third set of antennas. In some other embodiments, the antenna patterns 210 may function as a third set of antennas, and the antenna patterns 240 may function as a fourth set of antennas. In some embodiments, the antenna patterns 210 and 220 may collectively function as a first set of antennas, and the antenna patterns 230 and 240 may collectively function as a second set of antennas. The scan-angle coverage may refer to a transmitting range and/or a receiving range.

According to some embodiments of the present disclosure, with the design of the antenna patterns 210, 220, 230, and 240 having different radiation directions R1, R2, R3, and R4 not only the antenna gains can be increased, but the scan-angle coverage (e.g., scanning area or scanning angle) can also be increased. Moreover, according to some embodiments of the present disclosure, by varying the angle θ1, the angle θ2, and/or the angle θ3, the combination of sets of antennas with varying scan-angle coverages can vary according to actual applications, and thus the design flexibility of antenna structure can be increased.

Figure 7D:
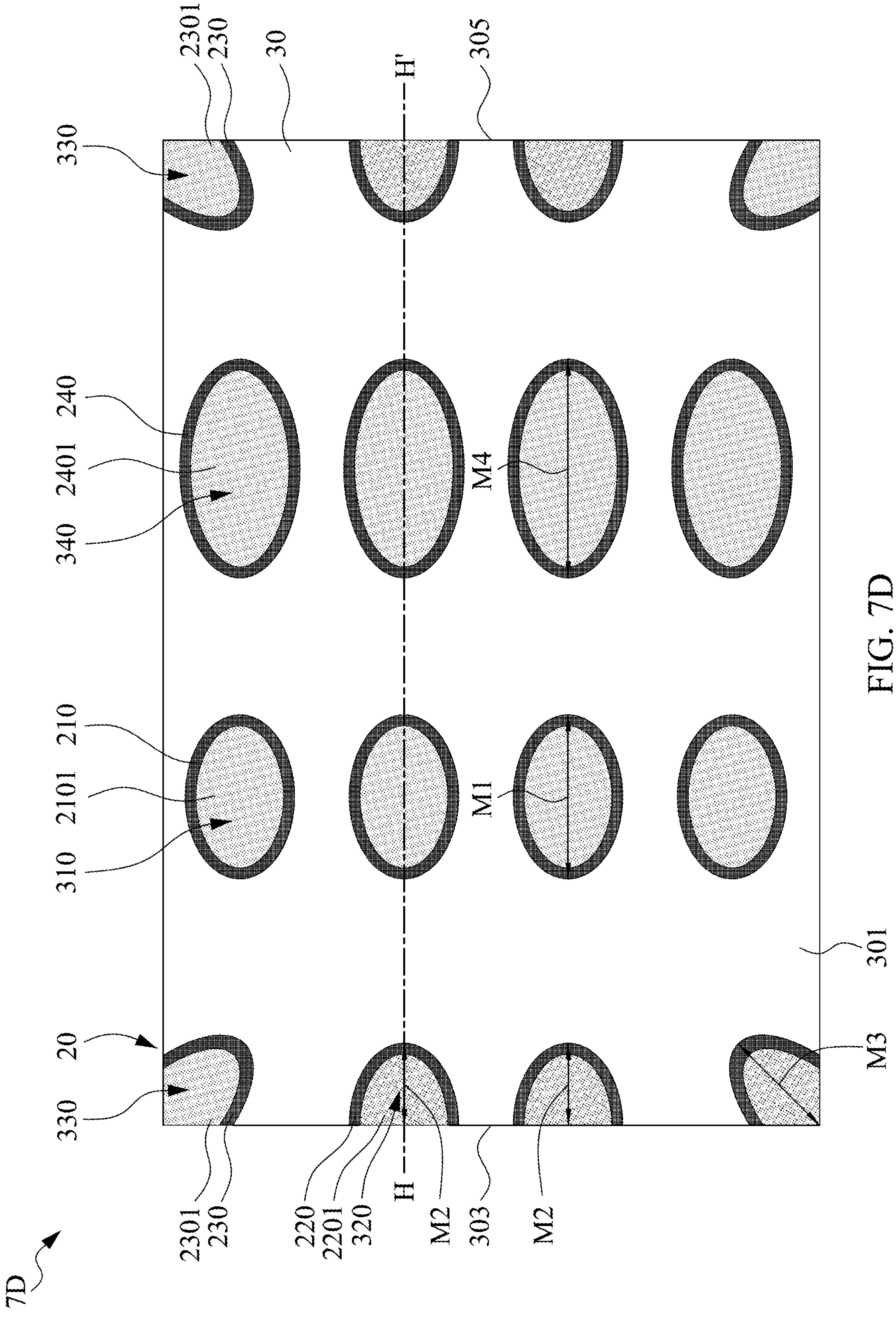
FIG. 7D is a top view of an electronic device in accordance with some embodiments of the present disclosure.

FIG. 7D is a top view of an electronic device 7D in accordance with some embodiments of the present disclosure. In some embodiments, FIG. 7A is a cross-section along line H-H' in FIG. 7D. The electronic device 7D is similar to the electronic device 7 in FIG. 7B with differences therebetween as follows.

In some embodiments, the radiation directions R2 of the antenna patterns 220 are substantially parallel.

Figure 8:
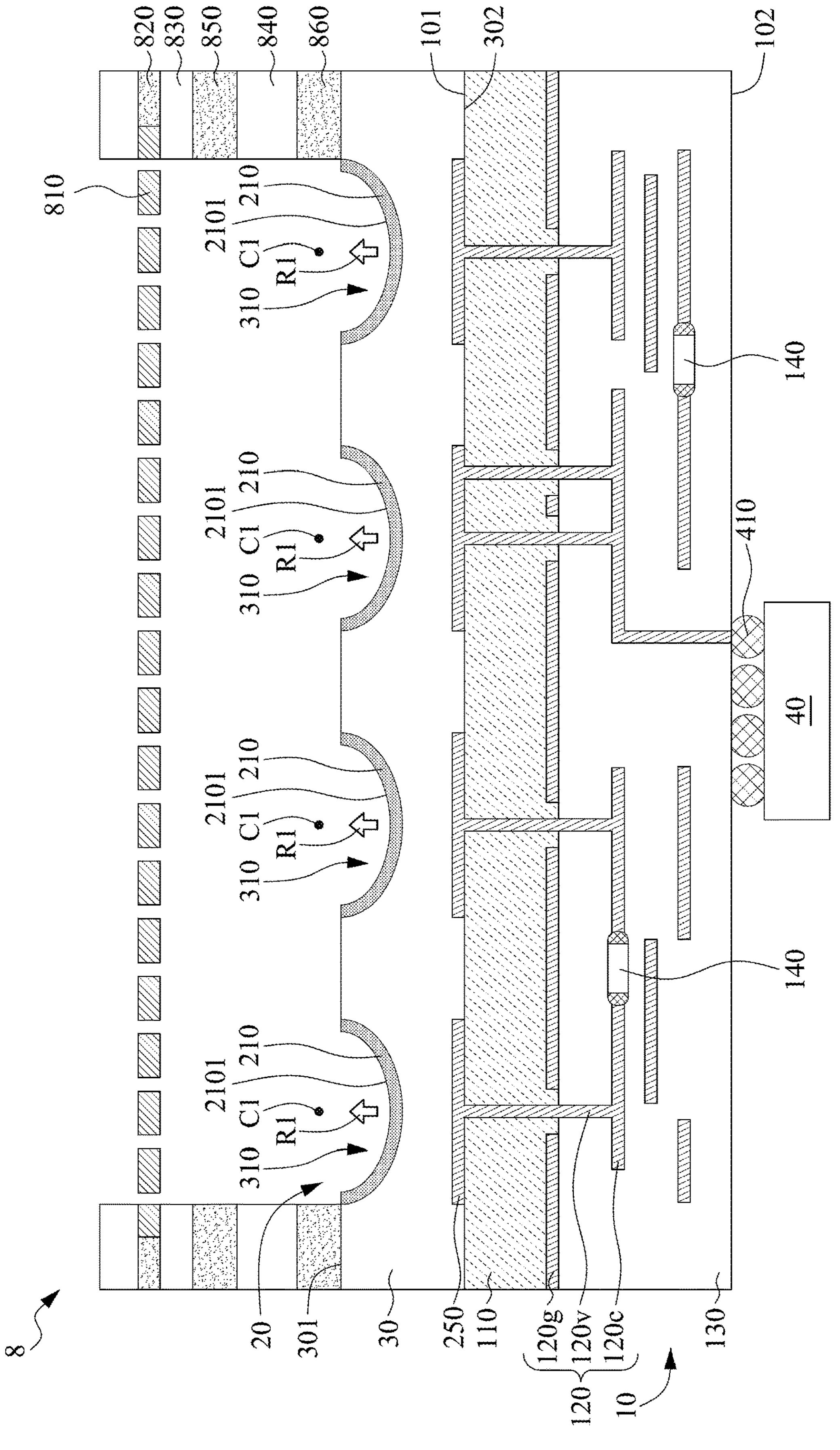
FIG. 8 is a cross-section of an electronic device in accordance with some embodiments of the present disclosure.

FIG. 8 is a cross-section of an electronic device 8 in accordance with some embodiments of the present disclosure. The electronic device 8 is similar to the electronic device 1 in FIG. 1A with differences therebetween as follows.

In some embodiments, the electronic device 8 includes a substrate 10, an antenna array 20, a carrier 30, an electronic component 40, an antenna element 810, adhesive layers 820, 850 and 860, a carrier layer 830, and a supporter 840.

In some embodiments, the antenna element 810 is disposed over the antenna array 20. In some embodiments, the antenna element 810 is attached to the carrier layer 830 through the adhesive layer 820. In some embodiments, the carrier layer 830 is attached to the supporter 840 through the adhesive layer 850. In some embodiments, the supporter 840 is attached to the carrier 30 through the adhesive layer 860. The adhesive layers 820 and 850 may be or include an adhesive or a gel. The adhesive layer 860 may be or include a die attach film (DAF). The carrier layer 830 and the supporter 840 may be formed of or include a semiconductor material, e.g., silicon.

In some embodiments, the antenna element 810 may be or include a frequency-selective surface (FSS) structure. The antenna element 810 may be configured to increase the range of the operation frequency of the antenna array 20, e.g., from about 28-30 GHz to about 25-30 GHz.

Figure 9A:
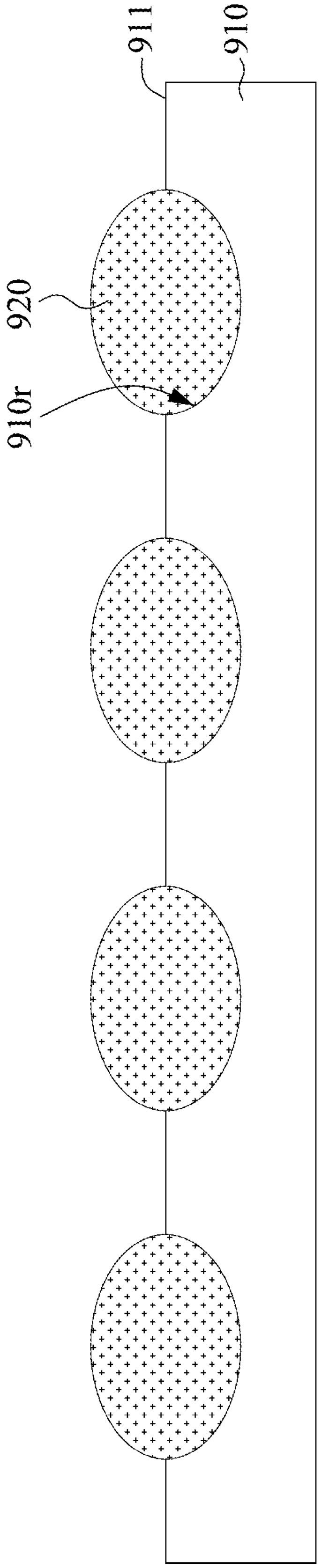
FIG. 9A, FIG. 9B, and FIG. 9C illustrate various operations in a method of manufacturing antenna patterns of an electronic device in accordance with some embodiments of the present disclosure.
Figure 9B:
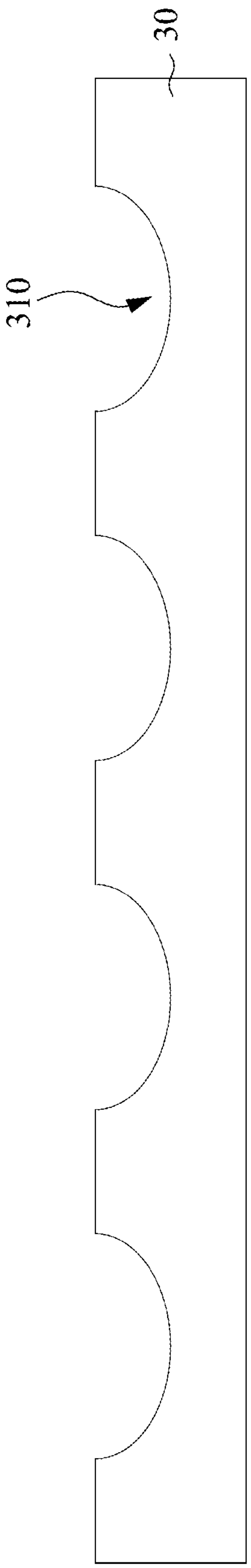
Figure 9C:
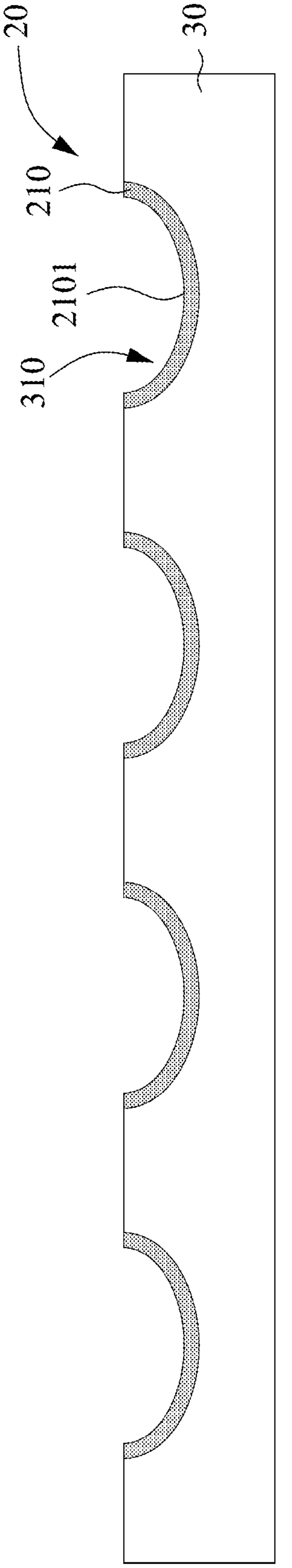

FIG. 9A, FIG. 9B, and FIG. 9C illustrate various operations in a method of manufacturing antenna patterns of an electronic device in accordance with some embodiments of the present disclosure.

Referring to FIG. 9A, a carrier material 910 may be provided, and molds 920 may be pressed into portions of the carrier material 910. In some embodiments, the carrier material 910 includes an encapsulant material. In some embodiments, recesses 910*r* are formed and recessed from a surface 911 of the carrier material 910. In some embodiments, the locations, the depths, the sizes, and the shapes of the recesses 910*r* may vary according to the design of the recesses (e.g., the recesses 310, 320, 330, and 340) of the carrier 30 to be formed subsequently. In some embodiments, the molds 920 may have various shapes and sizes according to the design of the recesses (e.g., the recesses 310, 320, 330, and 340) of the carrier 30 to be formed subsequently.

Referring to FIG. 9B, the molds 920 may be removed, and the carrier material 910 may be cured to form the carrier 30 having the recesses 310.

Referring to FIG. 9C, a conductive material may be formed on the inner surfaces of the recesses 310 to form antenna patterns 210 in the recesses 310. In some embodiments, the conductive material may be formed by electroplating or sputtering. As such, an antenna array 20 including the antenna patterns 210 is formed on the carrier 30.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of said numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and the like. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An electronic device, comprising:

an antenna array comprising a plurality of antenna patterns collectively configured to provide a scan-angle coverage, wherein each of the antenna patterns comprises a curved surface; and a carrier supporting the antenna patterns, wherein each of the curved surfaces is recessed from a top surface of the carrier.

2. The electronic device as claimed in claim 1, wherein at least two of the antenna patterns have different curvatures.

3. The electronic device as claimed in claim 1, wherein the carrier further has a first lateral surface and a second lateral surface opposite to the first lateral surface, and the top surface is extending between the first lateral surface and the second lateral surface.

4. The electronic device as claimed in claim 1, wherein the curved surfaces of the antenna patterns comprise a first curved surface extending from the top surface to a lateral surface of the carrier.

5. The electronic device as claimed in claim 4, wherein the first curved surface is recessed from the top surface and the lateral surface of the carrier.

6. The electronic device as claimed in claim 4, wherein the carrier has a bottom surface opposite to the top surface, and the first curved surface is closer to the bottom surface of the carrier than a second curved surface which is recessed from the top surface of the carrier is.

7. The electronic device as claimed in claim 1, wherein the carrier further has a first lateral surface and a second lateral surface connected to the first lateral surface, and the curved surfaces of the antenna patterns further comprise a first curved surface extending between the top surface, the first lateral surface, and the second lateral surface of the carrier.

8. The electronic device as claimed in claim 7, wherein the first curved surface is recessed from the top surface, the first lateral surface, and the second lateral surface of the carrier.

9. The electronic device as claimed in claim 7, wherein the curved surfaces of the antenna patterns further comprise a plurality of second curved surfaces recessed from the top surface and the first lateral surface of the carrier.

10. The electronic device as claimed in claim 9, wherein the antenna pattern having the first curved surface is configured to radiate electromagnetic (EM) radiation in a first radiation direction, and the antenna pattern having the second curved surface is configured to radiate EM radiation in a second radiation direction different from the first radiation direction.

11. The electronic device as claimed in claim 1, wherein the antenna patterns comprise a first antenna pattern and a second antenna pattern having bottom surfaces at different elevations with respect to the top surface of the carrier.

12. An electronic device, comprising:

a carrier having a plurality of recesses recessed from a top surface of the carrier; and an antenna array comprising a plurality of antenna patterns, wherein each of the antenna patterns comprises a curved surface to be configured to increase an antenna gain of the antenna array, and each of the antenna patterns is disposed in a corresponding recess of the plurality of recesses.

13. The electronic device as claimed in claim 12, wherein each of the antenna patterns is conformal to a concave surface of the corresponding recess of the plurality of recesses.

14. The electronic device as claimed in claim 12, wherein the plurality of recesses comprise a first recess and a second recess that are different in depths, sizes, shapes, or a combination thereof.

15. The electronic device as claimed in claim 12, wherein the antenna patterns comprise a first antenna pattern configured to radiate a first EM radiation in a first radiation direction and a second antenna pattern configured to radiate a second EM radiation in a second radiation direction different from the first radiation direction, and the first EM radiation and the second EM radiation are configured to conduct a far-field interference.

16. The electronic device as claimed in claim 15, wherein the antenna patterns further comprise a third antenna pattern configured to radiate a third EM radiation in a third radiation direction different from the first radiation direction and the second radiation direction, and the first antenna pattern and the third antenna pattern are configured to conduct a far-field interference.

17. An electronic device, comprising:

an antenna array comprising a plurality of antenna patterns configured to increase an antenna gain of the antenna array, wherein each of the antenna patterns comprises a curved surface and a curvature center, at least two of the curvature centers are located at different positions, and each of the antenna patterns comprises a dish antenna element or a cross-shaped antenna element having a same curvature center; and a carrier supporting the antenna patterns, wherein the cross-shaped antenna element extends between a top surface and a lateral surface of the carrier.

* * * * *